US012411759B2

(12) United States Patent
Phillippe et al.

(10) Patent No.: US 12,411,759 B2
(45) Date of Patent: *Sep. 9, 2025

(54) TECHNIQUES FOR MODEL ARTIFACT VALIDATION

(71) Applicant: Oracle International Corporation, Redwood Shores, CA (US)

(72) Inventors: Bryan James Phillippe, Fall City, WA (US); Hari Bhaskar Sankaranarayanan, Bengaluru (IN); Jean-Rene Gauthier, Temecula, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,195

(22) Filed: Nov. 13, 2023

(65) Prior Publication Data
US 2024/0078171 A1   Mar. 7, 2024

Related U.S. Application Data

(63) Continuation of application No. 17/515,123, filed on Oct. 29, 2021, now Pat. No. 11,847,045.

(51) Int. Cl.
*G06F 11/36* (2025.01)
*G06F 11/07* (2006.01)
(Continued)

(52) U.S. Cl.
CPC ...... *G06F 11/3688* (2013.01); *G06F 11/0769* (2013.01); *G06F 11/3692* (2013.01); *G06N 20/00* (2019.01)

(58) Field of Classification Search
CPC .. G06F 11/36; G06F 11/3688; G06F 11/0769; G06F 11/3692
See application file for complete search history.

(56) References Cited

U.S. PATENT DOCUMENTS 11,061,902 B2   7/2021  Idicula et al.
11,615,265 B2 * 3/2023  Karnagel ............ G06F 18/2148
                                              706/12
(Continued)

OTHER PUBLICATIONS

"ModelArtifacts", Available Online at: https://docs.aws.amazon.com/sagemaker/latest/APIReference/API_ModelArtifacts.html, Accessed from Internet on Nov. 1, 2021, 1 page.
(Continued)

*Primary Examiner* — Kamini B Patel
(74) *Attorney, Agent, or Firm* — Kilpatrick Townsend & Stockton LLP

(57) ABSTRACT

A model validation system is described that is configured to automatically validate model artifacts corresponding to models. For a model artifact being validated, the model validation system is configured to dynamically determine the validation checks to be performed for the model artifact, where the validation checks include various validation checks to be performed at the model artifact level and also for individual components included in the model artifact. The checks to be performed are dynamically determined based upon the attributes of the model artifact and of the components within the model artifact. The system is configured to generate a validation report that comprises information regarding the checks performed and the results generated from performing the various validation checks. The validation report may also include information suggesting actions for passing checks that result in a failed check, or for improving the scores of certain validation checks.

20 Claims, 12 Drawing Sheets

(51) Int. Cl.
  *G06F 11/3668*  (2025.01)
  *G06N 20/00*  (2019.01)

(56) References Cited

U.S. PATENT DOCUMENTS

| | | | | |
|---|---|---|---|---|
| 11,847,045 | B2* | 12/2023 | Phillippe | G06F 11/3688 |
| 11,868,756 | B2* | 1/2024 | Murthy | G06F 11/1469 |
| 2008/0155126 | A1* | 6/2008 | Swain | H04L 41/0886 |
| | | | | 709/251 |
| 2009/0300579 | A1* | 12/2009 | Dutta | G06F 8/10 |
| | | | | 717/105 |
| 2016/0019192 | A1* | 1/2016 | Crapo | G06F 40/30 |
| | | | | 715/234 |
| 2018/0039486 | A1* | 2/2018 | Kulkarni | G06F 8/10 |
| 2021/0263934 | A1* | 8/2021 | Idicula | G06N 3/084 |
| 2022/0129785 | A1* | 4/2022 | Vogeti | G06N 20/00 |
| 2022/0129787 | A1* | 4/2022 | Vogeti | G06N 20/00 |

OTHER PUBLICATIONS

"Preparing a Model Artifact", Available Online at: https://docs.oracle.com/en-us/iaas/data-science/using/models-prepare-artifact.htm, Accessed from Internet on Nov. 1, 2021, 2 pages.

U.S. Appl. No. 17/515,123, "Corrected Notice of Allowability", Aug. 30, 2023, 7 pages.

U.S. Appl. No. 17/515,123, "Non-Final Office Action", Apr. 26, 2023, 14 pages.

U.S. Appl. No. 17/515,123, "Notice of Allowance", Aug. 8, 2023, 9 pages.

* cited by examiner

Model Artifact 600 score.py File
610 runtime.yaml File
620

Schema.json File
630

Sample_payload.json File
640

Model Validation Report

Model Artifact-Level Checks:

Extraction Check: PASS (4 components extracted)

All components present?: PASS

Component-Specific Checks:

score.py:
    Method predict() present check: PASS
    Method load_model() present check: PASS
    Synthetic data input successful: PASS
    Output schema match: FAIL
        • Expression type mismatch in attribute columns 3, 6, and 9
    Orphan files check: PASS runtime.yaml:
    YAML lint validation: PASS
    Version match: FAIL
        • Version reference file numbers do not match
        • Fixed: Updated version reference file
    Runtime environment: PASS schema.json:
    Schema syntax validation: PASS
    Input/output schema definition key: FAIL
        • Missing input and output schema definition keys
        • Include a schema definition key in the artifact
    Definition objects present for ingest: PASS sample_payload.json:
    JSON Schema syntax validation: FAIL
        • Syntax failure in [17], [122], [196]
    Schema follows model input schema in schema.json: PASS
    score.predict() ingest consistency: PASS
    Valid Monte Carlo domain boundaries: FAIL
        • Out of bounds in iterations 67, 157, 311, 824, 994

OVERALL RESULT: FAIL

*FIG. 7*

TECHNIQUES FOR MODEL ARTIFACT VALIDATION

The present application is a continuation of U.S. patent application Ser. No. 15/700,784, filed on Sep. 11, 2017, entitled "TECHNIQUES FOR MODEL ARTIFACT VALIDATION" the entire contents of which are incorporated herein by reference for all purposes.

BACKGROUND

Recent years have seen a rapid increase in the adoption of Artificial Intelligence (AI) and machine learning (ML) models in various different industries and applications. ML models are built using a variety of components and in a variety of programming languages. The ML model may be designed to generate some prediction data based on input of a dataset to the ML model.

A model artifact is generally generated after a model has been trained and is ready for deployment in the production environment. A model artifact may comprise multiple components related to the trained model including related code or instructions, parameters (e.g., value of trained parameters), configuration information, and metadata (e.g. data attributes) related to the model. The model artifact can then be deployed to an environment where it is to be used to make predictions on real live data. A model artifact may be provided in various different forms. For example, a model artifact may be in the form of a package of software-based components optionally in compressed form. For example, a model artifact may be a zip file or an archive of multiple files used to deploy a model.

The generation of model artifacts is error-prone. Errors can happen if a wrong component is included in the model artifact, or if not all the requisite components are included in the model artifact, or if the format (e.g., filename) used for the component is incorrect, etc. Errors can also happen on a component level. For example, a file may be missing a particular required function, there may be syntax errors in one or more components, components may not conform to certain standards, etc. These errors may cause the deployment to fail, may cause the model to not function correctly, may make the model function less efficiently, may be less reliable, and the like.

It is thus useful to validate a model artifact, i.e., to check if the model artifact is correct, prior to deploying the model to ensure the model is stable and reliable. Conventionally, this validation is primarily done manually. Not only is this in itself error-prone, manual validation can only be done for very simple model artifacts. As the complexity of model artifacts increases, the ability to manually validate them decreases.

BRIEF SUMMARY

The present disclosure relates to validation of models and model artifacts, and more specifically to a model validation system that is configured to automatically validate model artifacts corresponding to models. For a model artifact being validated, the model validation system is configured to dynamically determine the validation checks or tests to be performed for the model artifact, where the validation checks include various validation checks to be performed at the model artifact level and also for individual components included in the model artifact. Various embodiments are described herein, including methods, systems, non-transitory computer-readable storage media storing programs, code, or instructions executable by one or more processors, and the like.

In certain embodiments, the model validation system dynamically determines the checks to be performed for a model artifact based upon the attributes of the model artifact and of the components within the model artifact. This is done by introspection of the model artifact and its components.

The model validation system is configured to generate a validation report for a model artifact that comprises information regarding the set of validation checks performed for the model artifact and the results obtained from performing the various validation checks. The validation report may then be communicated to an interested party. In certain embodiments, in situations where a validation check fails, the model validation system may also suggest one or more actions or operations to be performed to correct the validation check failure. In certain implementations, the validation system may itself perform one or more operations to correct one or more validation check errors.

The validation embodiments described herein provide an automated solution for validating model artifacts, and thus, the models they represent. Based upon the results of the validation, a report is generated to explain the results and suggest or even automatically apply responsive actions to improve/fix the model artifact. Validation of the model artifact may include multiple validation checks performed at both the model artifact-level and the underlying component levels. The validation checks to perform may be determined based on the extracted components of the model artifact, metadata determined from the model artifact, the composition of the model artifact, and other aspects of the model artifact.

The MVS may be implemented as a part of a cloud-based service on a server infrastructure. A client may be, for example, an owner of a model artifact that is seeking to validate their model artifact prior to deploying it for external use. Prior to deployment of the model, it is vital that the model be as efficient, error-free, and stable as possible in order to prevent costly problems at deployment time. Thus, the client may decide to validate the model artifact representing the model prior to deployment. To validate the model artifact, the client may send their model artifact to a MVS operating in a server domain that is separate from their own client domain, in order to perform validation. The server domain may implement a cloud-based infrastructure and services such as serverless compute instances to perform the validation.

In certain embodiments, techniques are disclosed wherein a model validation as a service system performs processing comprising, responsive to a model artifact received by a computing system comprising one or more computer devices, extracting, by the computing system and from the model artifact, a set of one or more components included in the model artifact, the model artifact corresponding to a model to be validated; determining, by the computing system, metadata for the model artifact and metadata for the set of one or more components; determining, by the computing system and based upon the metadata determined for the model artifact and the metadata determined for the set of one or more components, a set of validation checks to be executed for the model artifact; executing the set of validation checks to generate a corresponding set of validation results, the set of validation results comprising a first set of validation results associated with a first validation check in the set of validation checks; and generating, by the computing system, a validation report comprising information regarding at least the first validation check and at least the first validation result.

In certain embodiments, executing the set of validation checks comprises executing, by the computer system, the set of validation checks. In other embodiments, executing the set of validation checks comprises calling, by the computing system, one or more application programming interfaces (API) for invoking one or more serverless functions for executing the set of validation checks; and receiving, by the computing system, the set of validation results generated from executing the set of validation checks.

In certain embodiments, the process further comprises determining that the first validation result indicates a fail result for the first validation check; and responsive to determining that the first validation result indicates the fail result for the first validation check, determining a reason for the fail result for the first validation check, wherein generating the validation report comprises including information in the validation report indicative of the reason for the fail result for the first validation check. In some further embodiments, the processing further comprises determining a suggested corrective action for the first validation check, wherein generating the validation report comprises including information indicative of the suggested corrective action in the validation report.

In certain embodiments, executing the set of validation checks comprises selecting, from a pool of available compute instances, a first compute instance for executing the set of validation checks; and executing, by the selected first compute instance, the set of validation checks. In some further embodiments, the processing further comprises, subsequent to generating the validation report, releasing the first compute instance to the pool of available compute instances.

In certain embodiments, determining the set of validation checks comprises determining, based upon the metadata for the model artifact, the first validation check to be performed for the model artifact. In some further embodiments, determining the metadata for the model artifact comprises identifying a language associated with the model artifact; and the first validation check is based upon the language associated with the model artifact.

In certain embodiments, the first validation check comprises checking if all the components of the model artifact were successfully extracted.

In certain embodiments, the first validation check comprises checking whether the set of one or more components extracted from the model artifact includes a subset of components needed for deployment of the model.

In certain embodiments, determining the set of validation checks comprises determining, based upon the metadata for a first component in the set of one or more components, the first validation check to be performed for the first component. In some further embodiments, determining the metadata for the first component comprises identifying a language associated with the first component and the first validation check is based upon the language associated with the first component.

In certain embodiments, determining the set of validation checks comprises determining, based upon the metadata for the model artifact, the first validation check to be performed for the model artifact; and determining, based upon the metadata for a first component in the set of one or more components, a second validation check to be performed for the first component, and executing the set of validation checks comprises executing the first validation check to generate the first validation result; and executing the second validation check to generate a second validation result, and generating the validation report comprises including information regarding the first validation check, the first validation result, the second validation check, and the second validation result in the validation report. In certain further embodiments, the process further comprises determining that the first validation result indicates a fail result for the first validation check; determining that the second validation result indicates a fail result for the second validation check; responsive to determining the fail result for the first validation check, determining a reason for the fail result for the first validation check; and responsive to determining the fail result for the second validation check, determining a reason for the fail result for the second validation check, wherein generating the validation report comprises including information in the validation report indicative of the reason for the fail result for the first validation check, and the reason for the fail result for the second validation check.

In certain embodiments, executing the set of validation checks comprises generating one or more sets of synthetic data based on the metadata; and inputting the one or more sets of synthetic data into at least one component of the set of one or more components included in the model artifact to cause generation of output prediction data, wherein the set of validation results is based at least in part on the output prediction data.

In certain embodiments, a system, such as a model validation as a service system, comprises a processor and memory including instructions that, when executed by the processor, cause the device to perform the processing described herein. In other embodiments, a non-transitory computer-readable medium stores a plurality of instructions executable by one or more processors to cause the one or more processors to perform the processing described herein.

The foregoing, together with other features and aspects will become more apparent upon referring to the following specification, claims, and accompanying drawings.

BRIEF DESCRIPTION OF THE DRAWINGS

FIG. 6 depicts a simplified diagram illustrating an example model artifact according to at least one embodiment.

FIG. 7 depicts a simplified example model validation report illustrating model validation results according to at least one embodiment.

DETAILED DESCRIPTION

Figure 1:
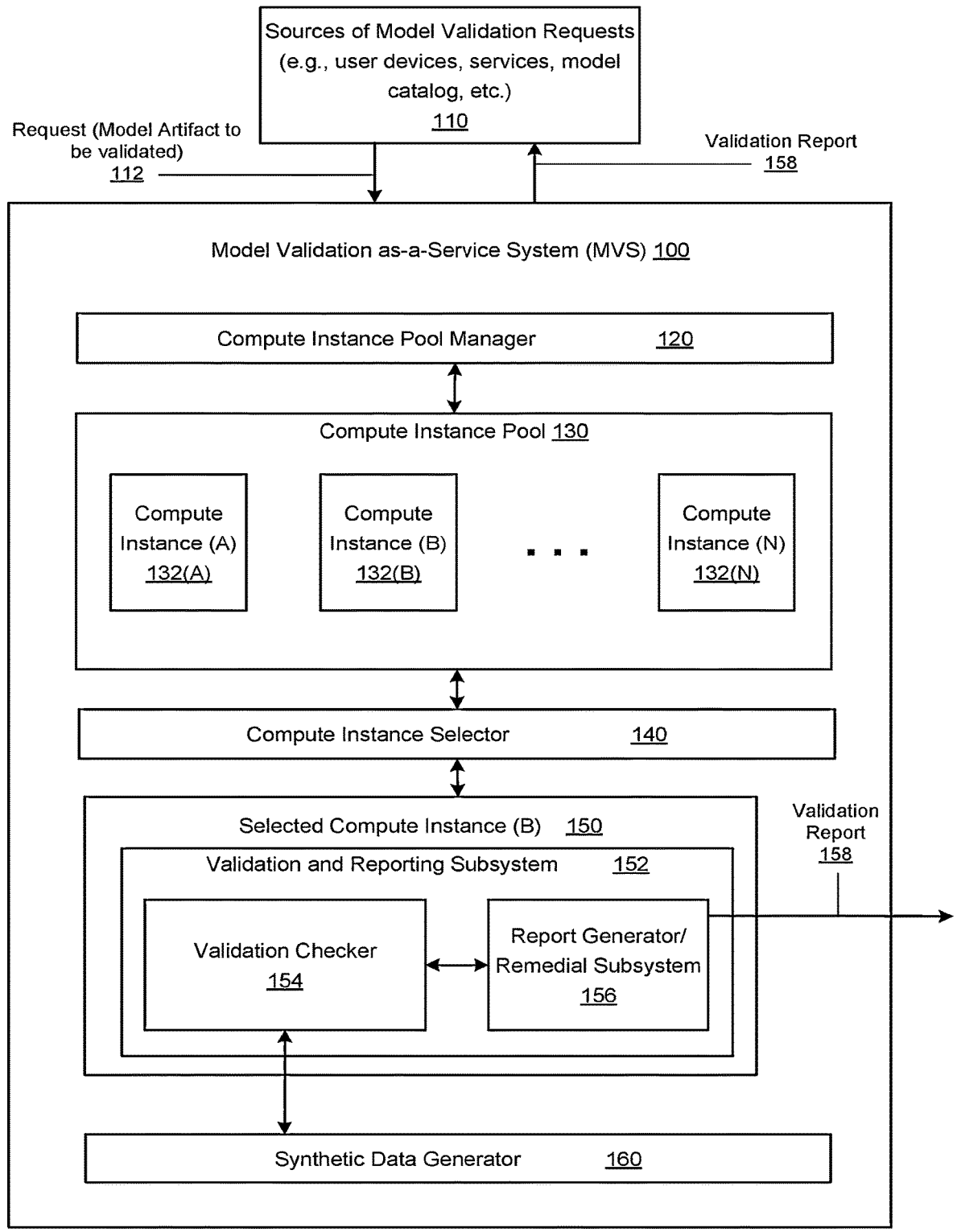
FIG. 1 depicts a simplified diagram of a distributed environment incorporating a model validation as a service system, according to various embodiments.

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any aspect or design described herein as "exemplary" is not necessarily to be construed as preferred or advantageous over other aspects or designs.

The present disclosure relates to validation of models and model artifacts, and more specifically to a model validation system that is configured to automatically validate model artifacts corresponding to models. For a model artifact being validated, the model validation system is configured to dynamically determine the validation checks to be performed for the model artifact, where the validation checks include various validation checks to be performed at the model artifact level and also for individual components included in the model artifact. The checks to be performed are dynamically determined based upon the attributes of the model artifact and of the components within the model artifact. The system is configured to generate a validation report that comprises information regarding the results generated from performing the various validation checks. The validation report may then be communicated to an interested party. Various embodiments are described herein, including methods, systems, non-transitory computer-readable storage media storing programs, code, or instructions executable by one or more processors, and the like.

The client may send their model artifact for validation as part of a validation request to the MVS. The MVS may intake and process the request to determine the model artifact, information about the model artifact, and the components making up the model artifact. For example, the MVS may first store the model artifact in a computer memory and extract various components from the model artifact, which will also be stored. The MVS may also utilize the model artifact and/or the components extracted from the model artifact to determine metadata for the model artifact. Based on the metadata determined for the model artifact, one or more validation checks may be determined and computing resources for performing the validation checks may be selected and provisioned.

Once the metadata for the model artifact has been determined, the MVS may prepare resources for validating the model artifact and generating a corresponding validation report. The MVS may select and provision computing resources for performing one or more validation checks. A pool of compute resources (e.g., processing units on a server system) may be managed by the MVS, or communicatively coupled to the MVS, to perform validation checks based on the model artifact received. Based on the availability of compute instances and the composition of the model artifact, the MVS will select one or more compute instances for performing validation checks on the model artifact. For example, the provisioned resources may be selected based on the metadata determined for the model artifact.

Once the compute instances have been provisioned by the MVS, the compute instances are utilized to perform the validation checks and generate a report based on the results of the validation checks. The validation checks for the model artifact may be determined based on the metadata determined for the model artifact and may correspond to the composition of the overall model artifact or the underlying components of the model artifact. For example, metadata determined for the model artifact may include a programming language for the files making up the components of the model artifact. Based on the programming language included in the metadata, a subset of validation checks may be determined. The metadata may further indicate one or more file types of the components. Based on the file type metadata, a further subset of the validation checks may be determined and selected for execution to validate the model, in a recursive fashion. The MVS may separately perform validation checks on the model artifact at different levels of granularity. For example, some validation checks may be based on composition/performance of the model artifact in the original, compressed, non-extracted state (i.e., the model artifact-level). Other validation checks may be based on the underlying components of the model artifact, separately (i.e., the component-specific level).

In some instances in which a dataset is used as input to a model to perform a validation check, a dataset received from the client may be input to the model artifact or components of the model artifact. In some cases, the client does not, or is unable to provide a dataset for use in validation checks that require a dataset input (e.g. the data relates to sensitive information, such as healthcare data, financial data, etc.). In these cases, the MVS may utilize a synthetic data generator to generate synthetic data to be input to the model artifact/components. The synthetic data may be generated, for example, by a generative adversarial network (GAN) ML model based on dataset categories (i.e. attributes of datasets) gleaned from the metadata determined for the model artifact.

The selection of the validation checks and the execution of the validation checks may be performed using selected and provisioned compute instances of the MVS. Subsystems of the MVS may separately perform validation checks, consolidation of results of the validation checks, generation of a report, generation of suggestions, etc. For example, the selected compute instance of the MVS may include a validation checking subsystem for performing the validation checks on the model artifact and its components to generate validation results. A separate report generation subsystem may utilize the results of the validation checks to generate a report. The report may include the validation checks performed, the results of the validation checks, and a number of suggested actions for improving/fixing the model artifact.

The report, including the suggested actions, may be forwarded off of the MVS for review by an entity, such as the client that submitted the original model artifact. For example, the client may receive the validation report and suggested actions responsive to sending the model artifact to the MVS for validation.

In certain embodiments, in situations where a validation check fails, the model validation system may also suggest one or more actions or operations to be performed to correct the validation check failure. In certain implementations, the validation system may itself perform one or more operations to correct one or more validation check errors. In some embodiments, one or more suggested actions are generated by the MVS. The suggested actions may relate to a reason that a model validation operation failed or did not pass the model validation operation in an optimal manner. The suggested action may further indicate an action or response that may be taken to improve or remedy the issues determined during the model validation operation. In some embodiments, the one or more suggested actions may cause the one or more operations to correct one or more validation check errors to occur. For example, if a model validation operation indicates that a component of the model artifact contains a syntax error, the one or more suggested actions may include a suggestion to syntactically correct a portion of that component. In some embodiments, the syntax correction may occur automatically by the MVS.

In certain embodiments, the functionality to validate models and their model artifacts may be offered as a cloud service by a cloud service provider (CSP). Subscribers to this service may submit a request for a model artifact corresponding to a model to be validated to a system (model validation-as-a-service system (MVS)) providing the service. The MVS may then analyze the model artifact and run a series of validation checks for the model artifact. The validation checks may be performed at the model artifact level and also at the component-level for one or more components within the model artifact. The MVS may then generate a validation report based upon the validation results generated from executing the various validation checks. The validation report may, for example, provide information about the validation checks performed, which checks passed, which checks failed, reasons why the checks failed, and other information related to the validation checks. The validation report may then be provided to the subscriber submitting the model artifact validation request. In certain implementations, the MVS may provide suggestions for correcting any validation error, where the suggestions may include one or more actions/operations to be performed for the model artifact. Information indicative of the suggestions may be included in the validation report communicated to the subscriber. In some instances, the MVS may also itself perform one or more actions to correct some of the validation check failures. Information indicative of the corrective actions taken by the MVS may be included in the validation report communicated to the subscriber.

For a model being deployed, validation of a model artifact for the model prior to deployment of the model artifact is important because it increases the probability that deployment will be successful, and the deployed model will function reliably and be stable in the production environment. Validation of a model artifact (and thus the underlying model for which the model artifact has been built) may involve performing validation checks at the model artifact level (e.g., checking if all the requisite components are included in the model artifact) and also at the level of each component within the model artifact (e.g., checking if a requisite function is included in a component). For example, validation of a model artifact (and thus the underlying model) may involve reviewing aspects of a model artifact, such as its composition and components to determine if the model artifact contains errors and/or inefficiencies.

Currently, model artifact validation is primarily done manually. Due to its manual aspect, this tends to be very error prone. Additionally, it requires the person performing the validation to have deep knowledge of the model and skills to perform the validation. Since this knowledge and skillset differs from person to person, there is never a guarantee that the validation was performed properly. Manual validation is also limited to simple models and is not practical or even possible to do manually for more complex models.

In some current industry approaches, end-users, such as owners of models and corresponding model artifacts, locally download and execute third-party utilities, which are narrowly tailored to check one or two aspects of the model artifact. These third-party utilities run locally and thus require significant client-side resources to download, store, and use. These locally implemented programs are often inconsistent, do not scale well, and are designed only to validate particular model artifacts in a very specific fashion. The programs are not reliable to validate model artifacts, and may introduce security issues to the model artifact owner's systems. The operator of these tools must furthermore understand the composition of the model artifacts in order to know how to validate them. In some use cases, clients have to write their own program code to perform certain validations, where the code is geared for a specific type of model artifact, and so validation code has to be written if the type of model artifact changes. Current industry-provided validation options are thus static, and limited in their applicability.

The MVS described herein provides a single-point, highly scalable, model validation and correction system that is highly scalable and resource-efficient. The validation functionality is provided as a cloud service to subscribing customers.

Multiple model artifacts of different types, compositions, file types, etc. may be processed and validated by the MVS, which may automatically extract metadata and components from the model artifact to determine a tailored set of validation checks to perform for the model artifact. Utilizing the embodiments, described herein, the client may validate a number of different model artifacts through a single remote portal automatically without requiring downloading/creation of validation software.

In certain implementations, the MVS may be implemented as part of system that uses or deals with ML models. For example, the MVS may be used by or may be implemented as part of a model catalog system that provides a repository where users can submit their models for use by others. As part of the model submission workflow, a model catalog system may use the MVS to validate a model artifact corresponding to a model being submitted to the model catalog system. Submission of the model may only be allowed if the model artifact passes the validation checks performed by the MVS. Such validation checks increase the confidence of both the model submitters and the users of the model from the model catalog. The submitters are more confident that a model that has successfully been submitted to the model catalog has passed the requisite validation checks and thus can be deployed successfully. Users of the model catalog are more confident that models submitted to the model catalog have been properly validated prior to submission and are more likely to work properly as intended. The MVS provides a single point of processing for validating many different types of models.

In various embodiments, the model validation system described herein provides an automated solution for performing different types of validation checks for a model and its corresponding model artifact. These checks may be performed at the model artifact level and also for each of the components in the model artifact. The system dynamically determines how to validate a model artifact that is submitted for validation based upon the model artifact being submitted. Upon receiving a model artifact to be validated, the system analyses and introspects the model artifact to determine attributes of the model artifact and components contained in the model artifact. Based upon the attributes and components, a set of validation checks that are customized for that model artifact are identified and performed. These checks include one or more checks that are executed at the model artifact level, such as to check if the model artifact contains the requisite components, and the like. The checks also include one or more checks that are specific to the components contained in the model artifact. These component-level checks are dynamically determined based upon the attributes of the components. In this manner, the set of checks that are executed are specific to each model artifact and are dynamically determined based upon the attributes of the model artifact, and the attributes of the components inside the model artifact.

Various different types and configurations of model artifacts can be automatically validated. Based upon the attributes of the model artifact and the components making up the model artifact, MVS may perform tailored validation checks. A comprehensive report is generated for a model artifact that includes the results of the various validation checks executed for that model artifact. For a model artifact being validated, the information in the validation report may identify the validation checks that were performed for the model artifact and the results of the validation checks, for example, whether the model artifact passed or failed a validation check.

In certain embodiments, for a validation check that failed or got a low score, the validation system may also suggest one or more actions/operations to pass that validation check or to improve the score for that validation check. The suggested actions when performed may enable an architect of the model and its corresponding model artifact to improve or refine the model artifact and the model so as to reduce model artifact deployment problems, improve model efficiency and performance of the model upon deployment, ensure consistent model execution, and in general improve the stability and consistency of model execution.

In certain implementations, the validation system may be configured to automatically perform one or more of the suggested corrective actions. In some embodiments, the MVS comprises one or more subsystems for automated remedial functionality. As described herein, automated remedial functionality includes any automated processes for modifying a model artifact in response to the validation results of a model without manual client interaction. For example, the MVS may perform, automatically and in response to generating the validation results, one or more suggested actions in the validation report to remedy determined issues with a model artifact.

The model validation system, as described herein, provides several technical advancements over conventional systems. A centralized and automated validation system is provided that does not involve any manual intervention. The checks to be performed are dynamically determined based upon the model artifact itself and its components. This avoids a static, one-size-fits-all solution. As new validation checks are devices, these are added to the list of validation checks that can be performed by the system. The system is thus flexible and dynamically expandable.

The user of the validation system does not have to be knowledgeable about the model artifact being validated or even about what validation checks to perform and how to perform them. This is all taken care of by the validation system. While conventionally only those having deep knowledge of the models and validation procedures could perform some of the validation checks, the validation system described herein enables any user, irrespective of the user's knowledge of models or about validation procedures, to submit requests to the validation system to validate model artifacts for various types of models. The techniques described herein can be used for validating models of different complexities from a simple model to very complicated models.

The complexity of a model can be based upon various different factors. For the example, the complexity of a model may be based upon the type of model (e.g., supervised, unsupervised, reinforcement learning, etc.), the type of prediction made by the model, and the performance criteria expected from the model (e.g., speed, accuracy, precision of the predictions). The complexity of a model may also be impacted by the number of components in the model artifact, the different languages for the components, the number of dependencies including inter-component dependencies, the complexity of the scoring system used to evaluate a model, and the like. A given algorithm can be complex in itself (e.g., a very deep neural network), the logic behind the combination of multiple individual algorithms to make an ensemble model can be complex, the number of custom modules (for example, Python files) on which a given model depends to run correctly can be large and each module can define complex algorithms and functions that transform the data, the business logic applied on top of what an algorithm returns can be complex as well.

The validation system is architected such that the validation checks are performed in a fast and efficient manner. In certain implementations, parallel processing concepts are used to execute the validation checks. For example, for a set of validation checks that is identified to be executed for a model artifact, threads or processes executing in parallel may be used to execute the set of validation checks, thereby competing the checks in an optimized manner in a fast time. In certain implementations, serverless compute concepts (e.g., serverless compute containers) may be used for performing the validation checks. A set of compute instances executing in parallel may be dedicated to performing the validation checks. These compute instances can be automatically scaled up or down (even down to zero) dynamically based upon the demand.

EXAMPLE SYSTEMS AND EMBODIMENTS

FIG. 1 depicts a simplified diagram of a distributed environment incorporating a model validation as a service system, according to various embodiments. As shown in FIG. 1, the distributed environment comprises multiple systems and subsystems. The distributed environment includes model validation as-a-service system (MVS) 100. MVS 100 includes various subcomponents utilizable to perform the methods and processes described herein. For example, MVS 100 may be configured to receive a model artifact for a source, such as a client, and responsively perform validation and report generation for the model artifact.

Source of model validation requests 110 may be a system, device, or other entity from which MVS 100 may receive a model artifact to be validated. Sources of model validation requests 110 may be, for example, a user/client device, a client-facing service, a model catalog, etc. In some embodiments, a source of model validation requests 110 is a user/client device, such as a computing device communicatively coupled to MVS 100. The user/client device may utilize a web portal to interact with MVS 100 through a representation state transfer (REST) architecture to generate and send a request for model validation. In some embodiments, a source of model validation requests 110 is a client-facing service, such as a web service communicatively coupled to MVS 100. The web service may be a cloud-operated service which includes a web portal through which a client may request validation of a model artifact as part of the cloud-operated service. The web portal may allow the client, via the client-facing service, to generate and send a request for model validation.

In some embodiments, a source of model validation requests 110 is a model catalog, such as a catalog of models and model artifacts communicatively coupled to MVS 100. The model catalog may be a repository of models that can be implemented and leveraged by clients or services. It is important that models in the model catalog execute consistently and efficiently; therefore the model catalog may require that the new models received or current models that are updated are validated prior to deployment in the model catalog. Accordingly, the model catalog may automatically generate and send requests for model validation to MVS 100. The requests that sources of model validation requests send to MVS 100 are represented in FIG. 1 as request 112 and may include the model artifact to be validated. In some embodiments, the request 112 may include additional information, such as a number of validation checks that the sources of model validation requests 110 would have the MVS 100 perform as part of model validation. An example of a model artifact is given below, with respect to FIG. 6.

MVS 100 includes compute instance pool manager 120. Compute instance pool manager 120 may be a subsystem of MVS 100 configured to manage a pool of resources for validating a model artifact. For example, as depicted in FIG. 1, compute instance pool manager 120 is communicatively coupled to compute instance pool 130. Compute instance pool manager 120 may be configured to provision and return provisioned resources to the compute instance pool 130 as part of the validation and report generation processes described herein. In some embodiments, MVS 100 may be sent, responsive to receiving request 112, a model artifact received as part of a request to a subsystem such as compute instance pool manager 120. Compute instance pool manager 120 may then extract information or data from the model artifact that will be used to determine a compute instance for validating the model artifact. This may involve determining some metadata for the model artifact and forwarding the metadata to a selector component. More information about metadata determination and use will be explained with reference with FIGS. 4 and 5 below.

MVS 100 includes compute instance pool 130, which may be managed by compute instance pool manager 120. Compute instance pool manager 120 may maintain and update data related to compute instances included in the compute instance pool 130. For example, compute instance pool manager 120 may maintain information about each instance of compute resources in compute instance pool 130, such as the size of the instance, the format of the instance, the current state of the instance (e.g. provisioned, not-provisioned, unavailable, corrupted, etc.), or any other information related to the compute instance of the pool. As depicted in FIG. 1, compute instance pool 130 of MVS 100 includes multiple compute instances 132(A)-(N). Each of compute instances 132(A)-(N) may be selected and provisioned for performing model validation processes as described herein.

MVS 100 includes compute instance selector 140, which may be a subsystem of MVS 100 configured to determine, select, provision, and return from provision, one or more compute instances 132 for a validation operation. Compute instance selector 140 may use any information relating to the model artifact and/or the compute instances to select a compute instance for provisioning. For example, the compute instance selector 140 may determine, based on metadata determined for the model artifact and the size of each provision-able compute instance, a particular compute instance for validating the model artifact. In a specific example, compute instance pool manager 120 sends metadata for the model artifact indicating a size of the model artifact and status information for multiple compute instances indicating a size of the compute instances to compute instance selector 140. Compute instance selector 140 may then use a selection algorithm, such as an artificial neural network, to select one or more particular compute instances to provision from the compute instance pool 130 for performing validation on the model artifact.

As depicted in FIG. 1, compute instance selector 140 has selected and provisioned selected compute instance (B) 150 as a compute instance for performing model artifact validation. In some embodiments, selected compute instance (B) 150 is included in MVS 100 and performs validation from within MVS 100. In some embodiments, selected compute instance (B) 150 is implemented in a separate serverless compute instance for performing validation using resources separate from MVS 100. Methods of selecting, provisioning, and returning provisioned compute instances will be discussed with respect to FIG. 3 below.

Selected compute instance (B) 150 includes validation and reporting subsystem 152. Validation and reporting subsystem 152 may be a subsystem within a compute instance, such as selected compute instance (B) 150 configured to perform validation operations on a model artifact according to the embodiments described herein. Validation and reporting subsystem 152 is configured to receive a model artifact, such as a model artifact received as part of request 112, perform validation checks on the model artifact, and output a generated result, such as a validation report. Validation and reporting subsystem 152 may include a number of subsystems for performing each of these operations.

As depicted in FIG. 1, validation and reporting subsystem 152 includes validation checker 154. Validation checker 154 is a subsystem of validation and reporting subsystem 152 configured to perform a set of validation checks on a model artifact. Validation checker 154 may be configured, for example, to receive a model artifact in an original format or an extracted format (the model artifact and one or more components extracted from the model artifact). If the model artifact is in an original format, the validation checker may extract the one or more components from the model artifact. In some embodiments, the validation checker may first copy the model artifact into a temporary file, extract the components from the temporary file, and store the extracted components alongside the original model artifact. Each model artifact and its underlying components may then be validated using one or more validation checks, by the validation checker 154.

Once validation checker 154 has access to the model artifact and the underlying components of the model artifact for validation, validation checker 154 may extract metadata from the model artifact and/or determine a set of validation checks to perform on the model artifact. The set of validation checks to be performed may include validation checks for the original un-extracted model artifact and validation checks for individual components of the model artifact. The metadata, which may be received by the validation checker 154 or determined by the validation checker 154 using the model artifact, may be used to determine the set of validation checks to perform. Examples of determining and performing validation checks are given with respect to FIG. 4 below.

As depicted in FIG. 1, validation and reporting subsystem 152 includes report generator/remedial subsystem 156. Report generator/remedial subsystem 156 is a subsystem of validation and reporting subsystem 152 configured to generate a report on validation performed by validation checker 154. Specifically, report generator/remedial subsystem 156 may be configured to receive validation results generated by validation checker 154 based on the validation checks performed therein and generate a report based on the results. Report generator/remedial subsystem 156 may be configured, for example, to receive a plurality of validation results comprising pass/fail states of various validation checks and corresponding information related to the pass/fail states. The report generator may categorize and consolidate this information into a human and/or computer readable report. Examples of generating a validation report are given with respect to FIG. 4 below. The validation report 158 generated by report generator/remedial subsystem 156 may be exported to one or more external systems/entities. For example, validation report 158 may be returned to sources of model validation requests 110 in response to the original request 112.

In some embodiments, report generator/remedial subsystem 156 is configured to generate, based on the validation results from validation checker 154, one or more suggested actions and/or one or more automated remedial functions. For example, based on the results of one or more model validations performed at validation checker 154, report generator/remedial subsystem 156 may determine one or more suggested actions for altering the model artifact or the underlying components. The modification may be a model artifact alteration that would change the results of one or more validation checks if implemented, an addition or subtraction that would add or remove one or more validation checks if implemented, etc. For example, in response to a validation check that determines that one or more source file components are missing from a model artifact, a suggested action may be generated corresponding to a recommendation to download and include the source files in the model artifact.

In some embodiments, report generator/remedial subsystem 156 is configured to perform one or more automated remedial functions based on one or more of the validation results, the report generated, and the generated suggested actions. The report generator/remedial subsystem 156 may perform the automated remedial functions automatically and independent of any input from a client/user of the MVS 100. For example, in response to generating a suggested action to download and include one or more source files in a model artifact, report generator/remedial subsystem 156 may automatically query a web resource for the one or more source files, add the source files to an uncompressed copy of the model artifact, and recompress a new model artifact including the one or more source files as components. The new model artifact may then be sent to a client/user of MVS 100, such as sources of model validation results 110, along with a validation report 158 to explain why certain automated remedial functions were performed.

MVS may include synthetic data generator 160. Synthetic data generator 160 may be a subsystem of MVS 100 configured to generate synthetic data for performing one or more validation checks. For example, one or more components of the model artifact may require input datasets to perform a validation check. The sources of model validation requests 110 may include these input datasets in the request 112, or the datasets may be created by synthetic data generator 160. Synthetic data is useful in situations where a client did not, or cannot supply input datasets for performing the validation checks that require an input dataset.

The synthetic data generator 160 may employ one or more ML techniques for generating the synthetic datasets. These techniques may include one or more machine-learning (ML) techniques, rules-based techniques, and others. In certain implementations, one or more machine-learning-based techniques may be used. For example, Generative Adversarial Networks (GANs) may be used to generate the synthetic data in the synthetic datasets, where the generated synthetic data closely resembles the original or real data. An example of a GAN architecture has been described in Ian J. Goodfellow et al., Generative Adversarial Nets, NIPS'14: Proceedings of the 27th International Conference on Neural Information Processing Systems, Volume 2, December 2014, pp. 2672-2680. The entire contents of the Goodfellow et al. publication are incorporated herein by reference for all purposes.

A GAN is capable of generating synthetic data based upon real data that is provided as input to the GAN. The synthetic data generated by a GAN mimics the real data in terms of essential parameters, univariate and multivariate distribution, cross-relations between the variables, and so on. During training, a GAN learns the true data distribution of the input training dataset with a view to generating new data points from this distribution with some variations and not just reproducing the old data the model has been trained on. In certain use cases, the synthetic data generated by a GAN can be used to augment the real data to produce synthetic datasets.

A typical GAN architecture consists of two adversarial models generally implemented as neural networks that compete with each other. These adversarial models include a generator neural network (generator) and a discriminator neural network (discriminator). The generator is trained to generate new synthetic data based upon real data provided as input to the generator. The discriminator is a type of classifier that is trained to differentiate between real data or synthetic data by estimating a probability that a sample generated by the generator is real data or generated data. During the training of a GAN, the generator and discriminator play a continuous adversarial game, as a result of which, as the training progresses, the generator learns to produce more realistic data samples based upon the input training data, and the discriminator learns to get better at distinguishing the generated synthetic data from the real data. This adversarial cooperation between the two networks is responsible for the success of the GAN, where they both learn at the expense of one another and attain an equilibrium over time.

A trained GAN can then be used to generate synthetic data for data provided as input to the GAN. A GAN, for example, may be used to generate the various synthetic datasets described in the disclosure. There are different GAN architectures for generating different types of synthetic data, including architectures for generating synthetic tabular data.

Other machine-learning-based techniques, other than GANs, may also be used to generate the synthetic datasets described in this disclosure. These techniques may include the use of neural networks (e.g., convolutional neural networks (CNNs)), Variational Autoencoders (VAEs), decision trees, random forest techniques, linear regression, other deep learning techniques, and others. Additionally, non-machine-learning based techniques may also be used in addition to or instead of machine-learning-based techniques to generate synthetic datasets. These include, for example, various sampling and best-fit techniques, Monte Carlo techniques, and others.

Further details related to processing performed by MVS for performance of validation and generation of validation reports are described below with reference to FIGS. 2, 3, 4, 5, 6 and 7.

Figure 2:
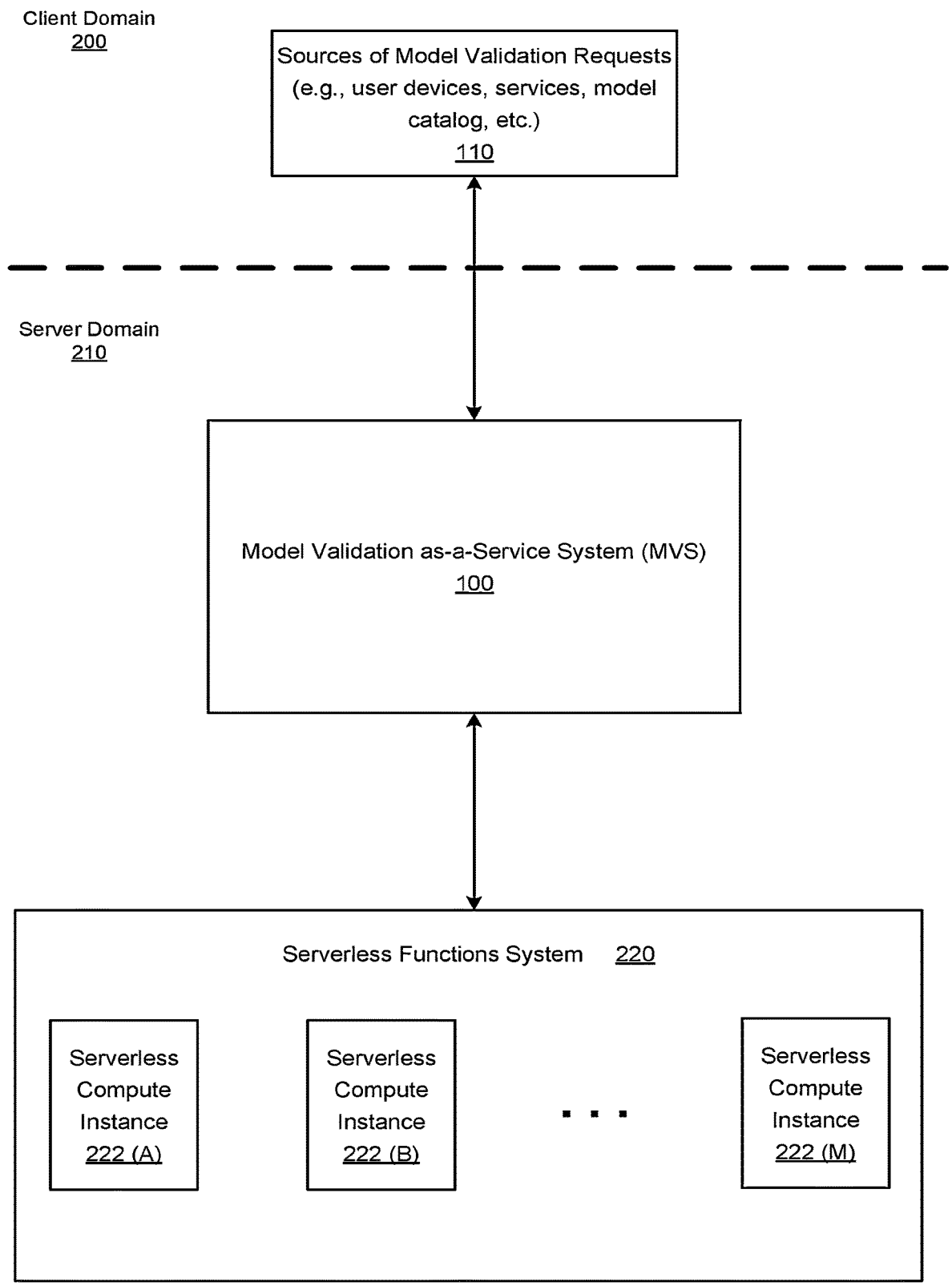
FIG. 2 depicts a simplified diagram of a distributed system incorporating a model validation as a service system, according to various embodiments.

FIG. 2 depicts a simplified diagram of a distributed system incorporating a model validation as a service system, according to various embodiments. As shown in FIG. 2, the distributed system comprises multiple systems and domains in which the systems operate. As depicted in FIG. 2, client domain 200 includes sources of model validation requests 110. As described herein, client domain 200 may include a system or grouping of computing resources within the control of a client, such as a client computing device. As described herein, previous methods of validation require a client to download and implement some third-party validation program within the client domain 200. Implementations of the third-party validation program are inefficient, do not scale, are inflexible with respect to differing types of models, and require the client to expend resources to ensure a problem validation.

As depicted in FIG. 2, sources of model validation requests 110 in client domain 200 are communicatively coupled to MVS 100, which is in server domain 210. Server domain 210 may be a domain outside of the control of a client such as sources of model validation 110 containing resources for performing validation checks and generating validation reports. For example, sources of model validation requests 110 may communicate with MVS 100 through a web-based architecture, such as REST. The web-based architecture allows a model artifact stored on a computing device as part of sources of model validation requests in client domain 200 to be sent to MVS 100 in server domain 210. Thus, systems in server domain 210 may perform highly scalable, comprehensive, and automatic model artifact validation without requiring resource expenditure by the client.

Server domain 210 includes serverless functions system 220, which is communicatively coupled to MVS 100. Serverless functions system 220 may be a set of serverless resources for performing serverless validation checks outside of MVS 100 as part of server domain 210. As depicted in FIG. 2, serverless functions system 220 includes a number of serverless compute instances 222(A)-(M). Serverless compute instances 222(A)-(M) are compute instances implemented on a serverless system for performing validation checks using a serverless architecture.

Serverless functions system 220 may operate independent of a particular hosting device and may be accessible by many other devices over a network and/or cloud infrastructure. For example, serverless functions system 220 may operate as a cloud-based architecture implementing serverless compute instances 222 across multiple devices. In various embodiments, a serverless function system, such as serverless functions system 220, comprises one or more components for executing serverless functions, such as model validation. A serverless function is a process/function implemented in a distributed computing environment. A caller device may be a device configured to generate and dispatch a function call to the server device in the distributed computing environment. The server device will supply the infrastructure resources and components to execute the function. The result of the executed function will then be returned to the caller device as a result. In some embodiments, function calls generated by the client device may be queued and executed at the server device in a particular order, such as a first-in-first-out configuration.

In some embodiments, MVS 100 may submit serverless function calls to serverless functions system 220 as part of a serverless architecture. For example, MVS 100 may submit one or more serverless validation check function calls to serverless functions system 220. The calls may include information for performing the serverless validation check functions, such as the model artifact, metadata, set of components of the model artifact, etc. The calls may be routed through a routing gateway and processed by serverless functions system 220. Serverless functions system 220 may utilize components stored thereon and/or other computer resources to execute serverless validation check functions. In some embodiments, serverless functions system 220 may route the validation check function calls to another system for performing the serverless drift check functions. Once a set of serverless validation check functions have been executed by serverless functions system 220 and a set of validation results has been generated, the set of result may be returned to the original caller device/system through the routing gateway. For example, once serverless functions system 220 generates the set of results, the set of results is returned to MVS 100 through a communication channel in server domain 210. MVS 100 may responsively generate a validation report and dispatch the validation report to a system in client domain 200, such as sources of model validation requests 110.

Figure 3:
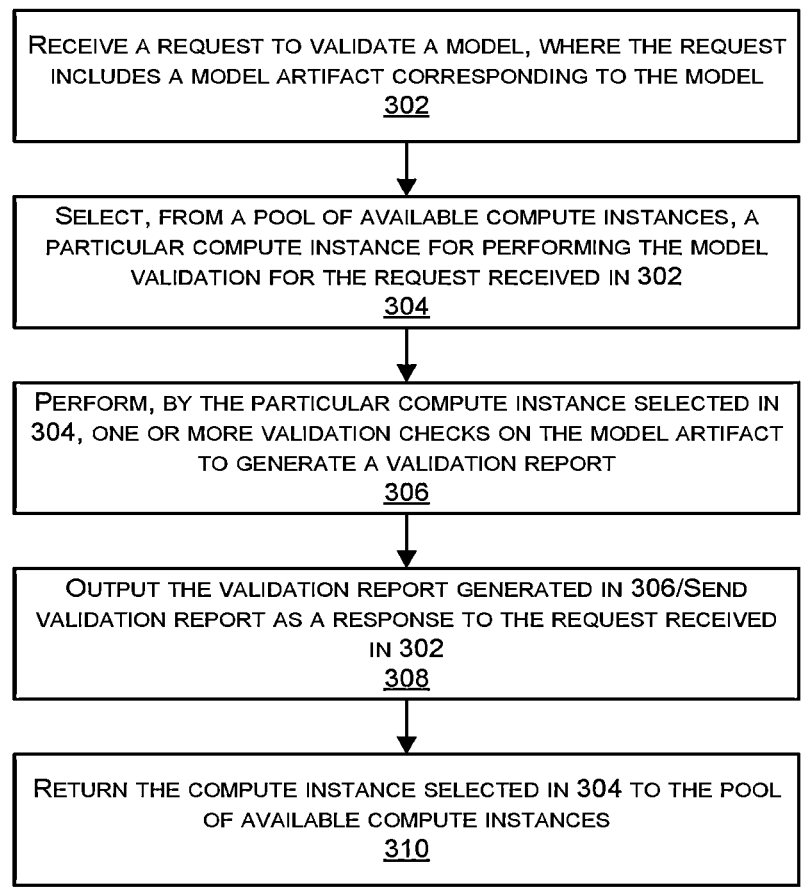
FIG. 3 depicts a simplified flow diagram illustrating an example process for performing one or more validation checks using compute instances of a model validation as a service system, according to various embodiments.

FIG. 3 depicts a simplified flow diagram illustrating an example process for performing one or more validation checks using compute instances of a model validation as a service system, according to various embodiments. Specifically, FIG. 3 illustrates an example process of provisioning a compute instance to perform validation checks and generate a validation report in response to a request to validate a model artifact. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 3 may be performed by MVS 100.

Process 300 may be initiated at 302, where a request to validate a model is received, where the request includes a model artifact corresponding to the model. The request to validate the model may be generated and sent by a client device used by a client that owns and/or maintains the model artifact. The request may include data including the model artifact in an original format, as well as additional data, such as a data-based indication to perform a validation of the model, metadata and validation configuration data that may affect the validation checks to be performed determination, etc. For example, a client entity such as sources of model validation requests 110 may send a request 112 including the model artifact, an indication to perform a validation, and an indication of one or more requested validation checks to a receiving system, such as MVS 100, which receives the request.

At 304, a particular compute instance for performing the model validation for the request received in 302 is selected from a pool of available compute instances. The particular computer instance may be selected based on the state of the pool of available compute instances, aspects of the model artifact, metadata determined for the model artifact etc. For example, a compute instance selector 140 may select a compute instance 132 from a compute instance pool 130 based on a selection algorithm configured to determine a predicted-best compute instance for performing validation checks. In an example embodiment, a compute instance selector 140 determines a compute instance 132 which has a resource pool large enough to validate a model artifact and which is currently available for provisioning in the compute instance pool 130. Other factors that may be considered for selecting the particular compute instance include, but are not limited to, programming language of components, processing throughput of compute instances, geographical location of serverless resources to perform validation, subscription tier of a requesting client to a service, etc.

At 306, one or more validation checks are performed by the particular compute instance selected in 304 on the model artifact to generate a validation report. The one or more validation checks are performed by a compute instance, such as any of compute instances 132(A)-(N) as selected from the compute pool 130, and are used to validate the various aspects of the model artifact. In some embodiments, the validation is performed by a validation and reporting system, such as validation and reporting system 152, of the selected compute instance. More information about performance of validation checks and the generation of the validation report will be described with reference to FIG. 4 below.

At 308, the validation report generated in 306 is output and the validation report is sent as a response to the request received in 302. The generated report may be sent, for example, from the MVS 100 back to the source of model validation requests 110 as a validation report 158 in response to the original request 112 for validation of a model artifact.

At 310, the compute instance selected in 304 to the pool of available compute instances is returned to the pool of available compute instances. For example, the compute instance pool manager 120 may provision and return provisions of compute instances 132 to and from a computer instance pool 130 as part of the validation process. Once the validation process is complete, the compute instance pool manager may return resources utilized by the compute instance to the compute instance pool 130 for future validations.

Figure 4:
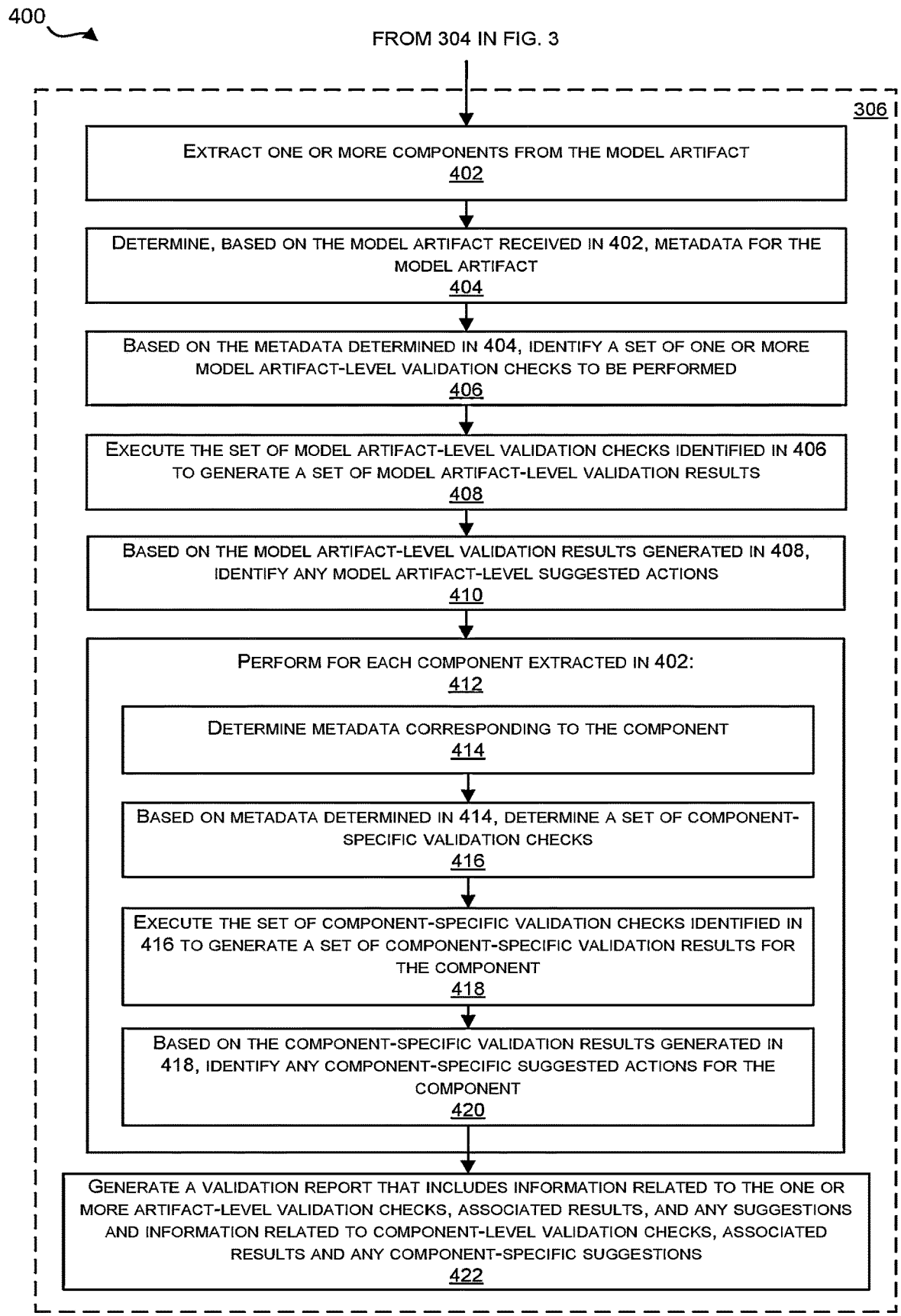
FIG. 4 depicts a simplified flow diagram further illustrating an example process for performing one or more validation checks at artifact and component levels of a model artifact using a model validation as a service system, according to various embodiments.

FIG. 4 depicts a simplified flow diagram further illustrating an example process for performing one or more validation checks at artifact and component levels of a model artifact using a model validation as a service system, according to various embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 4 may be performed by MVS 100.

Process 400 may begin at step 304 described above with reference to FIG. 3, where a particular compute instance for performing the model validation for the request received in 302 is selected from a pool of available compute instances. The process may then proceed to 306, where one or more validation checks on the model artifact to generate a validation report are performed by the particular compute instance selected in 304. The performance of the one or more validation checks on the model artifact to generate a validation performed may comprise multiple sub-steps as part of process 400.

Process 400 may then proceed to 402, where one or more components from the model artifact are extracted. Specifically, the one or more components that make up the model artifact are determined and extracted from the original model artifact in its compressed format. More information about the model artifact will be given below with reference to FIG. 4. Extraction of the one or more components may include decompressing the model artifact to retrieve one or more underlying components which make up the model artifact in its original compressed state. For example, the model artifact may be presenting in a compressed file format, such as a "zipped" format (i.e., a .zip file), in which each of the underlying components is a file in the compressed .zip format. The one or more components are not retrievable directly from the compressed .zip format, and the .zip file must first be decompressed before the one or more components may be identified.

Once the model artifact is decompressed, the decompressed model artifact may be processed, such as by a processing subsystem of MVS 100, to determine the one or more underlying components. The one or more underlying components may be moved, replicated, regenerated or otherwise stored in memory, effectively "extracting" them from the model artifact. In some embodiments, an initial model artifact-level validation check includes a determination of whether the original model artifact may be decompressed and the underlying one or more components extracted.

At 404, metadata for the model artifact is determined. Specifically, a computing resource, such as a subsystem of MVS 100, may process the model artifact to determine some metadata for the model artifact. In some embodiments, the metadata may be generated by a subsystem of MVS 100 subsequent to determining one or more aspects of the model artifact. In some embodiments, the model artifact is received with some metadata integrated into or separate from the model artifact. The metadata determined may include information about any aspect of the model artifact. Examples of aspects of the model artifact that the metadata may describe include, but are not limited to, the type of compression used to generate the model artifact, the file type, the number of underlying components, an input schema, and output schema, a data size, a data type, a programming language, a client owner of the model artifact, a source from which the model artifact was received, and/or a destination for the model artifact to be deployed.

At 406, a set of one or more model artifact-level validation checks to be performed is identified based on the metadata determined in 404. Specifically, a system such as MVS 100 may parse the metadata determined in 404 for the model artifact to determine the one or more model artifact-level validation checks to be performed to generate validation results. As the metadata determined in 404 is metadata for the model artifact, each of the validation checks determined in 406 will be validation checks for the model artifact at the overall artifact level of granularity. The one or more model artifact-level validation checks may be determined using any aspect of the metadata or in any manner capable of identifying one or more validation checks.

The metadata determined in 404 may be used to determine a subset of validation checks from which to identify the one or more artifact-level validation checks. For example, one or more programming languages may be determined from the metadata determined in 404, the one or more programming languages being languages in which the model artifact is programmed. Accordingly, a subset of validation checks specifically tailored for validating model artifacts programmed in the one or more programming languages may be determined and the model artifact-level validation checks may be chosen from the determined subset of validation checks.

The model artifact-level validation checks may vary based on the type of model received, and are determined responsive to receiving the model artifact. In one example, an extraction validation check determines if components may be extracted from the overall model artifact. In another example, a "components-present" check determines if the model artifact contains all the required components to operate a model of a type specified by the metadata for the model artifact.

At 408, the set of model artifact-level validation checks identified in 406 is executed to generate a set of model artifact-level validation results. Specifically, provisioned resources, such as a compute instance 132 of a compute instance pool 130 in a MVS 100 may use dedicated resources to instantiate and perform the validation checks determined in 406. In various embodiments, some or all of the artifact-level validation checks identified in 406 are performed in parallel. For example, provisioned resources, such as a compute instance 132, may provision multiple validation containers for performing each validation check, where each of the validation checks determined in 406 is executed in different containers of the compute instance 132 in parallel. Executing the set of model artifact-level validation checks may include instantiating a version of each validation check and passing the validation checker a replicated instance of the overall model artifact to perform the validation check. For example, a validation check may include parsing the overall model artifact according to a set of rules or parameters as determined by the validation check to determine if the model artifact conforms to a set of expected functions/configurations.

Based on the executed set of model-level validation checks, a corresponding set of model artifact-level validation results is generated. The validation results may be some set of data or information corresponding to a result of performing the validation check. In some embodiments, a validation result includes an indication of a "pass" or "failure" corresponding to whether one or more attributes of the model artifact match expected attributes defined in the validation check. In some further embodiments, a validation result includes information relating to the indicator of why a particular validation check is a "pass" or a "failure."

At 410, any model artifact-level suggested actions for the model artifact are identified based on the model artifact-level validation results generated in 408. Specifically, based on the results generated in 408, one or more suggested actions are generated which may improve model functionality or remedy "failed" validation checks. More information regarding failed validation checks is discussed below with regard to FIG. 5. Suggested actions may be actions, refinements, additions, deletions, or other remedies for improving the composition of the model artifact based on the results of the model artifact-level validation checks performed. For example, if a validation check for included components returns a "failure" indication indicating that the model artifact is missing one or more necessary components, a suggested action for adding the one or more necessary components may be generated. These model artifact-level suggested actions may be included in a comprehensive report, such as the report depicted with reference to FIG. 7 below.

Once processes regarding the model artifact-level validation checks are performed, process 400 may continue to 412, in which a sub-process is performed for each component extracted in 402. For example, the sub-process of 412 may be performed iteratively for each component extracted in 402 until a sub-process has been performed for each extracted component. The sub-process of 412 may therefore facilitate validation checking for component-level aspects of the model artifact as opposed to the model artifact-level validation checking performed in 404-410.

As part of 412, at 414, metadata corresponding to the component is determined. For example, metadata corresponding to a current component that is the subject of a current sub-process in 412 may be determined. Specifically, a computing resource, such as a subsystem of MVS 100, may process the current component of the model artifact to determine some metadata for the current component. In some embodiments, the metadata may be generated by a subsystem of MVS 100 subsequent to determining one or more aspects of the current component. In some embodiments, the current component includes some metadata integrated into or pointed to by the current component. The metadata determined may include information about any aspect of the current component. Examples of aspects of the current component that the metadata may describe include, but are not limited to, the file name of the current component, the file type, the number of the current components relative to other components in the model artifact schema, an input schema, an output schema, a data size, a data type, a programming language, a source from which the current component was generated, and/or a type of model that the component represents.

At 416, a set of component-specific validation checks is determined based on the metadata determined in 414. For example, a set of component-specific validation checks may be determined for the current component that is the subject of a current sub-process in 412 based on the metadata determined in 414. The component-specific validation checks may vary based on the type of current component. In one example, a function check determines if the current component includes required functions within the programming text of the component file. In another example, a schema check determines if the current component is presented in a particular configuration that comports with a predefined schema for components of the same type.

At 418, the set of component-specific validation checks identified in 416 is executed to generate a set of component-specific validation results for the component. For example, the set of component-specific validation checks determined in 416 for the current component that is the subject of a current sub-process in 412 is executed at 418.

Specifically, provisioned resources, such as a compute instance 132 of a compute instance pool 130 in a MVS 100, may use dedicated resources to instantiate and perform the validation checks determined in 416 for the current component. In various embodiments, some or all of the component-specific validation checks identified in 416 are performed in parallel. For example, provisioned resources, such as a compute instance 132, may provision multiple validation containers for performing each validation check, where each of the validation checks determined in 416 are executed in different containers of the compute instance 132 in parallel. Executing the set of component-specific validation checks may include instantiating a version of each validation check and passing the validation checks a replicated instance of the current component to perform the validation check. For example, a validation check may include parsing the current component according to a set of rules or parameters as determined by the validation check to determine if the current component conforms to a set of expected functions/configurations. In some embodiments, the number and type of compute instances to use for parallel checking may be determined based on factors such as the complexity of the artifact to validate, the current compute load, a customer service tier, etc.

Based on the executed set of component-specific validation checks, a corresponding set of component-specific validation results is generated. The validation results may be some set of data or information corresponding to a result of performing the validation check. The validation result may also include indications of a "pass" or "failure" corresponding to whether one or more attributes of the current component match expected attributes defined in the validation check. In some further embodiments, a validation result includes information relating to the indicator of why a particular validation check is a "pass" or a "failure."

At 420, any component-specific suggested actions for the component is identified based on the component-specific validation results generated in 418. For example, the set of component-specific validation checks executed in 418 which generate validation results for the current component that is the subject of a current sub-process in 412 are used to identify suggested actions for the current component. Specifically, based on the results generated in 418, one or more suggested actions are generated which may improve component functionality or remedy "failed" validation checks. More information regarding failed validation checks is discussed below with regard to FIG. 5. Suggested actions may be actions, refinements, additions, deletions, or other remedies for improving the composition of the current component based on the results of the component-specific validation checks performed. For example, if a validation check for a component schema returns a "failure" indication indicating that the current component does not conform to an expected file schema, a suggested action for editing the files of the current component may be suggested. These component-specific suggested actions may be included in a comprehensive report, such as the report depicted with reference to FIG. 7 below. The sub-process of 412 may then end.

At 422, a validation report that includes information related to the one or more artifact-level validation checks, associated results, and any suggestions and information related to component-level validation checks, associated results and any component-specific suggestions is generated. The report may include the results of the executed validation checks in 408 and 418, as well as the suggested actions generated in 410 and 420 in a comprehensive human or computer-readable report. This may end the sub-process of 306.

Figure 5:
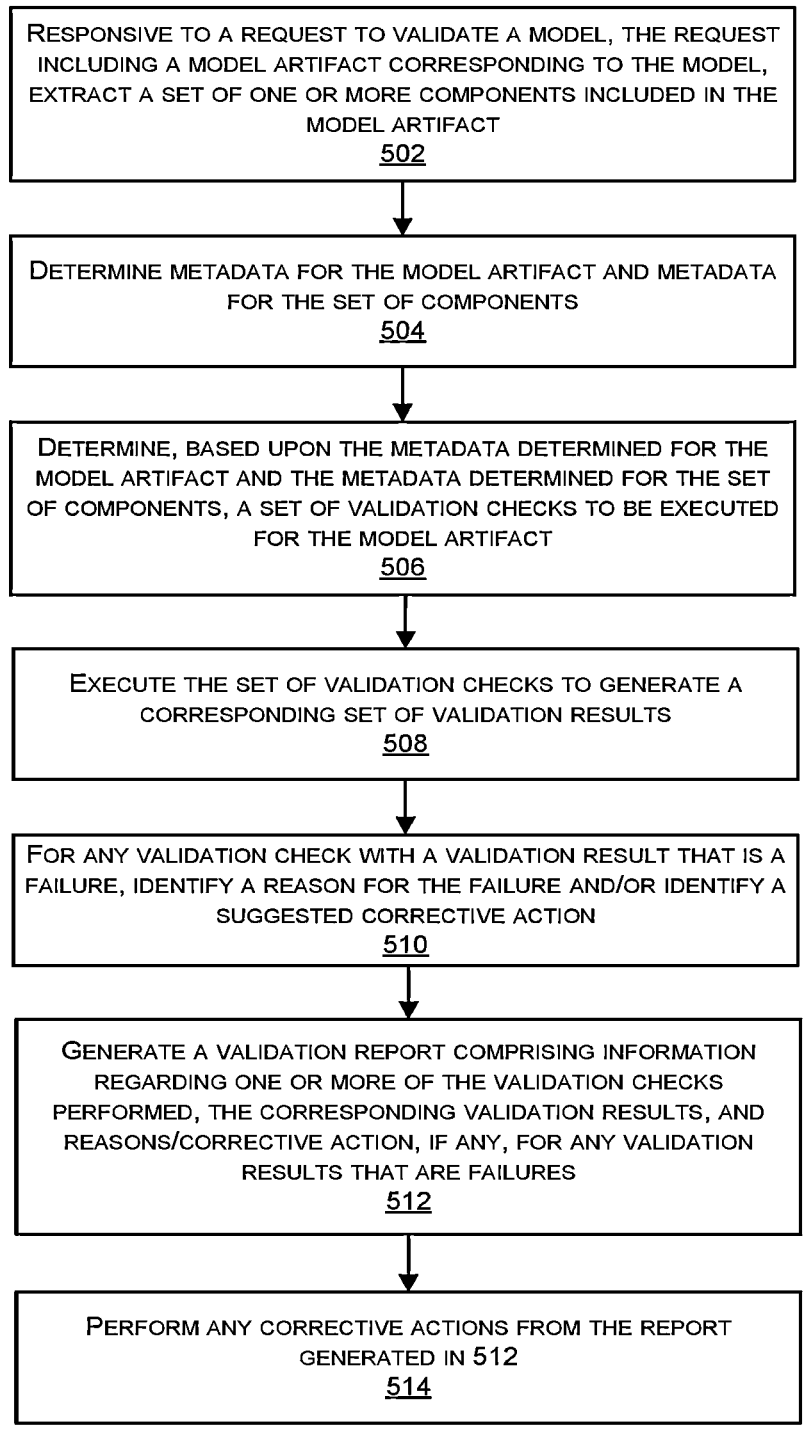
FIG. 5 depicts a simplified flow diagram illustrating an example process for determining and executing a set of validation checks based on metadata determined for a model artifact according to various embodiments.

FIG. 5 depicts a simplified flow diagram illustrating an example process for determining and executing a set of validation checks based on metadata determined for a model artifact according to various embodiments. Specifically, FIG. 5 illustrates an example process of generating a validation report containing results of a set of validation checks including indications of any failures and suggested/corrective actions that may be taken for a corresponding portion of the model artifact. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 5 may be performed by MVS 100.

Process 500 may be initiated at 502, where a set of one or more components included in a model artifact is extracted responsive to a request to validate a model, the request including the model artifact corresponding to the model. The extraction of the one or more components included in the model artifact may be performed in a manner similar to the extraction is 402. For example, the model artifact may be processed by MVS 100 to determine a compression scheme and/or one or more components which make up the model artifact. The components may then be extracted from the compressed model artifact.

At 504, metadata for the model artifact and metadata for the set of components are determined. The determination of the metadata may be performed in a manner similar to the determinations in 404 and/or 414. For example, the model artifact may be processed by MVS 100 to determine one or more aspects/data attributes of the model artifact and the underlying one or more components to determine the metadata.

At 506, a set of validation checks to be executed for the model artifact is determined based upon the metadata determined for the model artifact and the metadata determined for the set of components. The determination of the validation checks to be executed may be performed in a manner similar to the determinations in 406 and 416. For example, the metadata may be processed by MVS 100 to determine one or more aspects of the model artifact in original form as well as one or more files, aspects of files, data attributes of files, metadata of files, or other information regarding the one or more components to determine corresponding artifact-level and component-level validation checks to be performed, respectively.

The determination of the set of validation checks is dynamically determined based on aspects of the model artifact received as part of 502. For example, two different model artifacts received as part of the request for validation may comprise different components and different configurations of components. The MVS 100 will parse a particular model artifact to dynamically determine the set of validation checks to be performed based on that particular model artifact, specifically. The dynamic determination may be based on, for example, the metadata determined in 504. For example, the metadata may be extracted from a particular artifact and parsed for information relating to the particular corresponding model artifact. The validation checks may then be determined based on the metadata such that the validation checks to be performed are tailored to that particular model artifact.

At 508, the set of validation checks is executed to generate a corresponding set of validation results. The execution of the validation checks may be performed in a manner similar to the execution of validation checks in 408 and 418. For example, the validation checks may be loaded into and executed on individual containers of a compute instance in MVS 100 to generate one or more validation results that may be compiled into a set of validation results. The set of validation results may contain indicators of the result state of each validation check that was executed. For example, each validation result may correspond to a state of "pass" or "failure" (or simply "fail") depending on the results of the execution of the validation checks on the particular components.

At 510, for any validation check with a validation result that is a failure, a reason for the failure and/or a suggested corrective action for the failure is identified. A validation result is a "failure" if the state of the validation result is a "failure" state, representing that an aspect of the model artifact and/or an underlying component does not correspond to a correct state or is not within a correct threshold of acceptability. Thus, when a set of validation checks is performed, such as in 508, a corresponding subset of validation results will include a failure state. Each failure state in turn corresponds to a validation check performed and to an aspect of the model artifact or a component.

At 514, any corrective actions from the report generated in 512 are performed. The entirety of a set of corrective actions, a subset of the corrective actions, or none of the corrective actions included in the generated report may be performed. For example, in response to receiving a client configuration for a source system/device indicating to perform all suggested actions during validation, an MVS may perform all of the corrective actions in the validation report generated in the validation report in 512. In another example, a client configuration may indicate that only validation is to be performed, and no corrective actions should be performed, in which case the MVS will not report any corrective actions.

FIG. 6 depicts a simplified diagram illustrating an example model artifact according to at least one embodiment. Specifically, model artifact 600 includes multiple components 610-640 which make up the model. The example embodiment of model artifact 600 depicted in FIG. 6 includes at least four files representing the components of the model artifact 600. While FIG. 6 depicts at least four sample components, it will be appreciated that the model artifact 600 depicted in FIG. 6 is only a specific example embodiment of the makeup of a model artifact, and any number or type of components may make up a model artifact. Namely, model artifact 600 includes components score.py file 610, runtime.yaml file 620, schema.json file 630, and sample_payload.json file 640. Each of the files 610-640 is a component of model artifact 600 and may be included in validation checks as part of a validation of a model represented by model artifact 600. For example, the files 610-640 are examples of components that may be included in a compressed zip archive of a model artifact 600.

Score.py file 610 is a file that may contain function definitions necessary for loading a model artifact into memory and make predictions as part of a machine learning process. For example, score.py file 610 may be a file coded in the python programming language and include multiple functions for loading a ML model and generating prediction data.

Runtime.yaml file 620 is a file that may contain a listing of references, such as a definition of a runtime conda environment reference necessary for deploying a model with certain services. In some embodiments, runtime.yaml file 620 may instead contain a list of third-party dependencies, a Dockerfile, a reference to a docker image stored in an image registry, a conda pack stored in a shared file system, etc. For example, runtime.yaml file 620 may be a file in a YAML Ain't Markup Language (YAML) language that specifies information for the runtime environment, such as a version, a conda type, a path to an environment stored on a shared file system, and other information.

Schema.json file 630 is a file that may contain metadata about the data input that a model, such as a ML model may take as input. For example, schema.json file 630 may be an optional file within that model artifact 600 that specifies a specific schema for an input dataset, such as feature types, column names, and example outputs. The file may be coded in the JavaScript Object Notation (JSON) format.

Sample_payload.json file 640 is a file that may contain a sample data payload to a ML model to cause input of the data payload to the model to generate prediction data. For example, sample_payload.json file 640 may be an optional file with the model artifact 600 that may be input into a prediction component of the model artifact to generate a corresponding ML predicted output. The file may be coded in the JSON format as well.

FIG. 7 depicts a simplified example model validation report illustrating model validation results according to at least one embodiment. As depicted in FIG. 7, a report 700 may be presented in a readable format to an entity, such as a customer or data scientist. As depicted in FIG. 7, a model validation report may be presented in a human-readable format. The particular model validation report depicted in FIG. 7 may correspond to the example embodiment described above relating to model validation processes for a model artifact 600 and various corresponding components. For example, report 700 may depict the results of multiple validation checks performed on the four components 610-640 of model artifact 600, namely "score.py" file 610, "runtime.yaml" file 620, "Schema.json" file 630, and Sample_payload.json" file 640.

As depicted in FIG. 7, report 700 includes a readout report of validation checks performed at the artifact level. These include an "extraction check" and an "all components present" check. Indications of the validation result for both tests are also included. For example, as depicted in FIG. 7, the "extraction check" validation check has an indication of "PASS." This indicates that the extraction check validation check corresponds to a pass state. Further information is next to the "PASS" indication, stating that four components were extracted. This corresponds to the score.py, runtime.yaml, schema.json, and sample_payload.json files that make up the model artifact. In the example report 700, the extraction check has passed with four components extracted and the "all-components-present" check has passed, indicating that all components necessary for the particular model artifact 700 are present.

As depicted in FIG. 7, report 700 also includes a readout report of validation checks performed at the component level. These include checks for each of the extracted components score.py, runtime.yaml, schema.json, and sample_payload.json. A first set of component level checks may be performed on the score.py file. A first check performed may be a method predict( ) present check. This check may validate whether a python function exists in the score.py file named "predict( )" As depicted in FIG. 7, the component has passed the validation check. A second check performed may be a method load model( ) present check. This check may validate whether a python function exists in the score.py file named "load model( )" As depicted in FIG. 7, the component has passed the validation check. A third check performed may be a synthetic data input successful check. This check may validate whether input of a synthetic dataset to the methods written in the score.py file was successful. As depicted in FIG. 7, the component has passed the validation check. A fourth check performed may be an output schema match check. This check may validate whether an output set of prediction data generated based on the input of a synthetic dataset to the score.py file matches an expected output schema. As depicted in FIG. 7, the component has failed the validation check. Below the indication of "FAIL," the report includes information related to a reason for the failing of the validation check. For example, the report indicates that an expression type mismatch between the actual output and the expected output occurred in attribute columns 3, 6, and 9. A fifth check performed may be an orphan files check. This check may validate whether all python files in the model artifact art referenced in the score.py file (i.e. are not orphaned). As depicted in FIG. 7, the component has passed the validation check.

Another set of component level checks may be performed on the runtime.yaml file. A first check performed may be a YAML lint validation check. This check may validate whether a YAML file contains errors, bugs, stylistic errors, and/or suspicious constructs. As depicted in FIG. 7, the component has passed the validation check. A second check performed may be a version match validation check. This check may validate whether a YAML file is a latest version of a YAML file in the YAML configuration. As depicted in FIG. 7, the component has failed the validation check. Below the indication of failure, a reason for failure states that the version reference file numbers of the component version file in the model artifact and the latest version file of YAML do not match in reference number. The report further includes a suggested action which has been performed as an automated remedial function, namely that the updated version reference file has been incorporated to "fix" the version mismatch. A third check performed may be a runtime environment validation check. This check may validate whether a YAML file contains a valid reference to a runtime environment. As depicted in FIG. 7, the component has passed the validation check.

Another set of component level checks may be performed on the schema.json file. A first check performed may be a schema syntax validation check. This check may validate whether the schema.json file includes a proper JSON syntax. As depicted in FIG. 7, the component has passed the validation check. A second check performed may be an input/output schema definition key validation check. This check may validate whether the schema file contains either an input schema definition key or an output schema definition key. As depicted in FIG. 7, the component has failed the validation check. Below the indication of the failure, the report states that the schema.json file is missing both the input and output schema definition keys. The report further includes a suggested action to include a schema definition key in the model artifact. A third check performed may be a "definition-objects-present-for-ingest" validation check. This check may validate whether the schema.json file contains a valid definition object for each feature that will be ingested by a model when input. As depicted in FIG. 7, the component has passed the validation check.

Another set of component level checks may be performed on the sample_payload.json file. A first check performed may be a JSON syntax validation check. This check may validate whether the sample_payload.json file follows the proper JSON syntax. As depicted in FIG. 7, the component has failed the validation check. Below the indication of the failure, the report includes information that syntax failures have occurred in sections [17], [122], and of the file. A second check performed may be a schema match with a schema.json validation check. This check may validate whether the sample_payload.json file follows the definition of the model input schema defined in the schema.json file. As depicted in FIG. 7, the component has passed the validation check. A third check performed may be a score.predict( ) ingest consistency validation check. This check may validate whether the sample_payload.json file, when ingested by score.predict( ) returns any errors, returns values specified in the sample_payload.json file, and returns predicts that follow the output schema expected in sample_payload.json. As depicted in FIG. 7, the component has passed the validation check. A fourth check performed may be a Monte Carlo domain boundary validation check. This check may validate, using a Monte Carlo method, that replacing all values of a given feature in sample_payload.json by its boundary values and validating the model returns results within the prediction domain. As depicted in FIG. 7, the component has failed the validation check. Below the indication of failure, the report states that out-of-bounds values were returned in iterations 67, 157, 311, 824, and 994 of the Monte Carlo check.

Report 700 further includes an overall result after the validation check results are described. The overall result may be an indication of a pass or failure state based on the combination of all validation check results described in the report. For example, even though some validation checks may result in failure, the combination of the failure validation checks with other passed validation checks may result in an overall pass result, or vice versa. As depicted in FIG. 7, the overall result of the validation of the model artifact is a "FAIL" result.

Additional examples of validation checks include, for predictive ML model artifacts and components, syntax errors, model introspection errors, argument introspections, presence of dependency classes and other checks. Additional examples of runtime configuration validation checks include mandatory parameters runtime checks, version value checks, environmental availability validation such as deployment environment path, cross-validation import lists in environmental manifests, and other checks. Additional examples of schema validation checks include conformity to syntax and standard checks, input/output schema for a sample payload, range value validations, and other checks. Additional examples of general validation checks may include introspection validation tests for model bias and discrimination, level of privacy protection, and security of a model. For some checks that neither pass nor fail a check, but are instead in a format that may be improved while not being incorrect, a "WARN" result may be provided.

Additionally, validation may be performing in any order, including in parallel to any other validation. For example, the MVS 100 may determine to perform validation on the following file types in order: a prediction file, a runtime configuration file, a schema definition file, and a sample payload file, prior to generating the report. Introspection order may be determined based on a decision tree executing recursively based on components of the model artifact, starting with more or less essential components of the model artifact. For example, introspection order may be based on a file type decision tree (e.g., certain file types are separated into parallel compute instance containers and parsed).

In various embodiments, a user, such as the client generating the original validation request, may view a process metric and polling state based on a validation ID generated when the MVS begin validation of the model artifact. The client may view the process until the report in generated, at which point the client will receive the report for their viewing. The viewing of the process and/or the report may take place at a graphical user interface implemented at a client device and communicatively coupled to the MVS.

Example Infrastructure-as-a-Service Implementation

Figure 8:
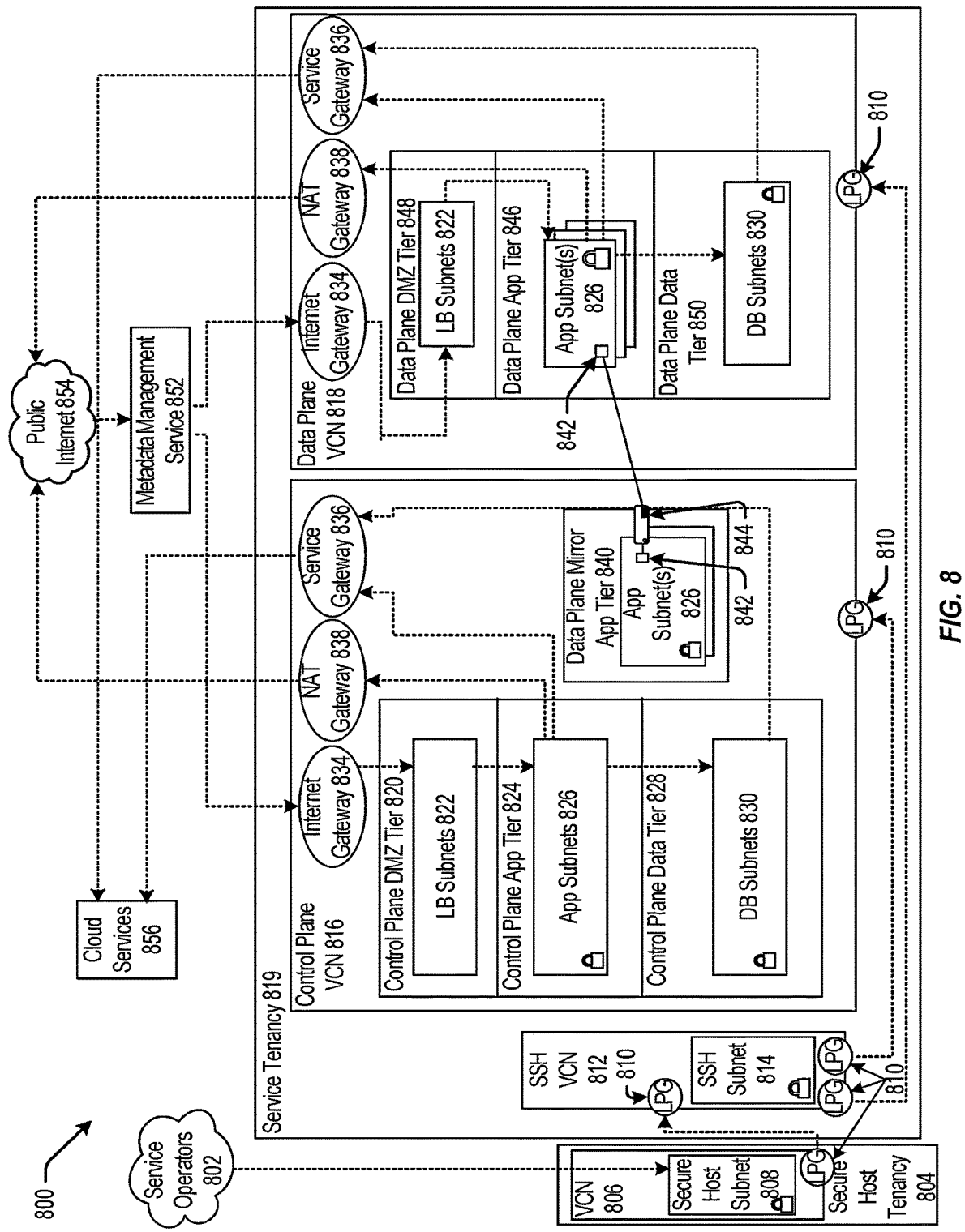
FIG. 8 is a block diagram illustrating one pattern for implementing a cloud infrastructure as a service system, according to at least one embodiment.

FIG. 8 depicts a MVS for validating and reporting results of validation for model artifacts according to various embodiments. As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
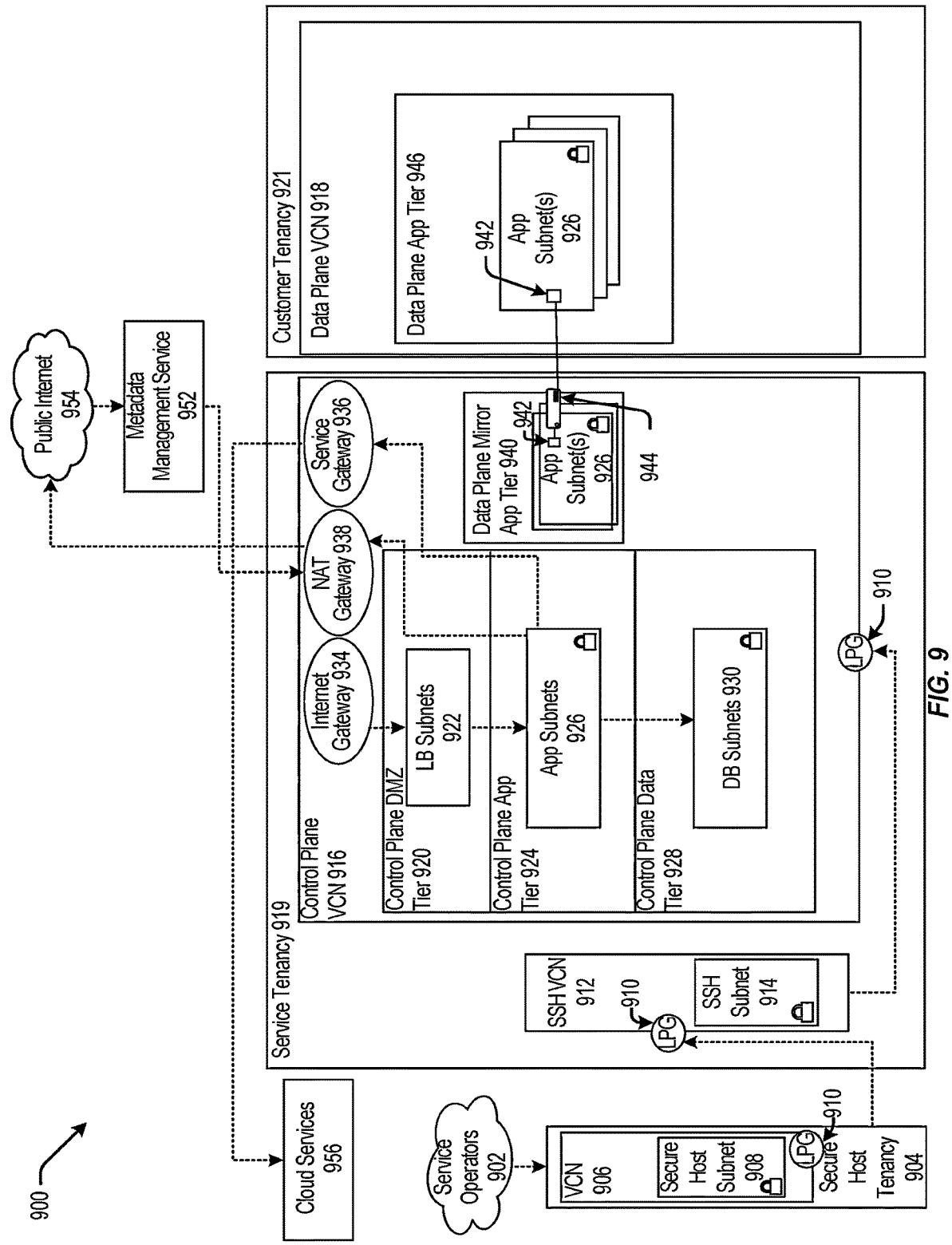
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918, but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
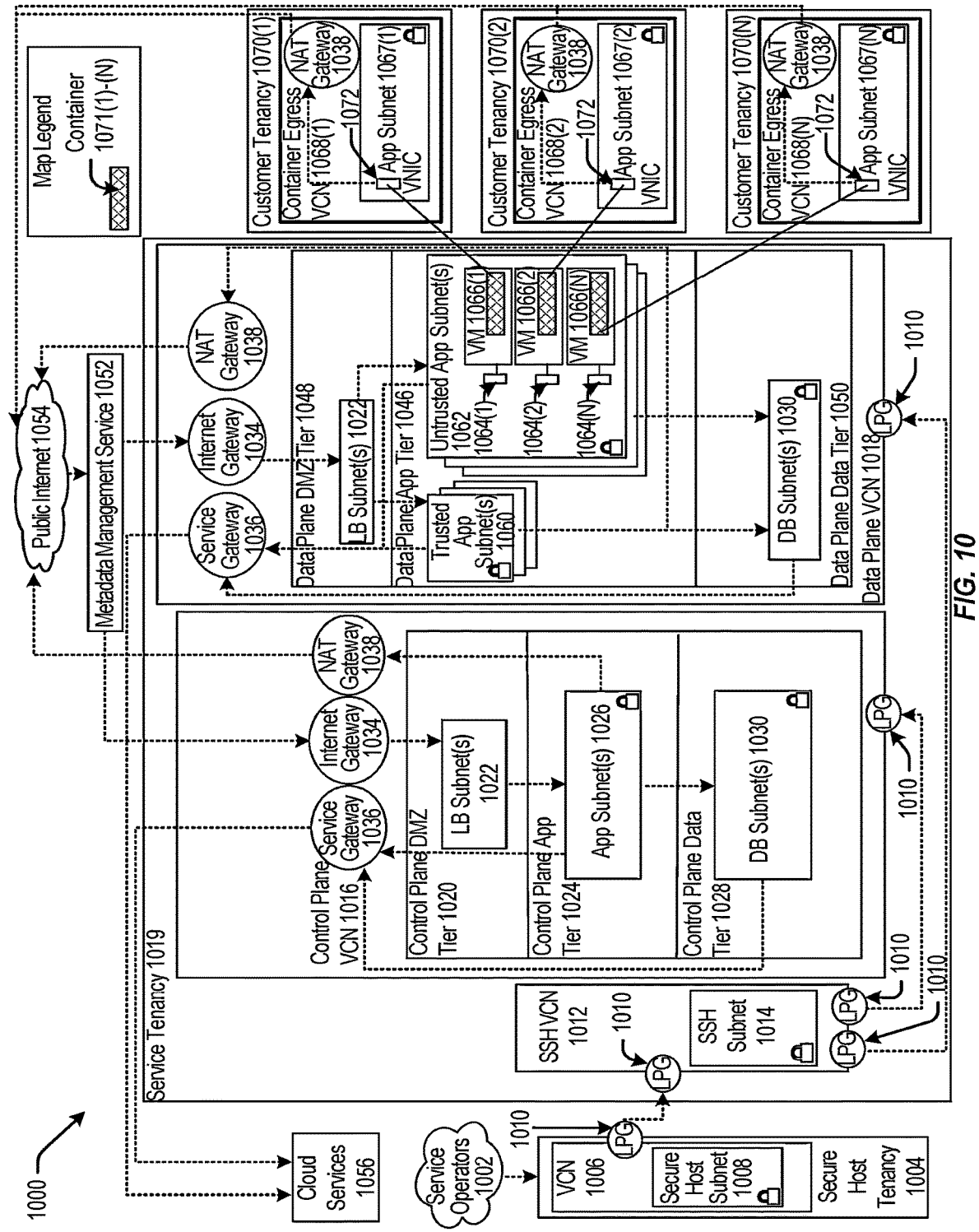
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), and a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
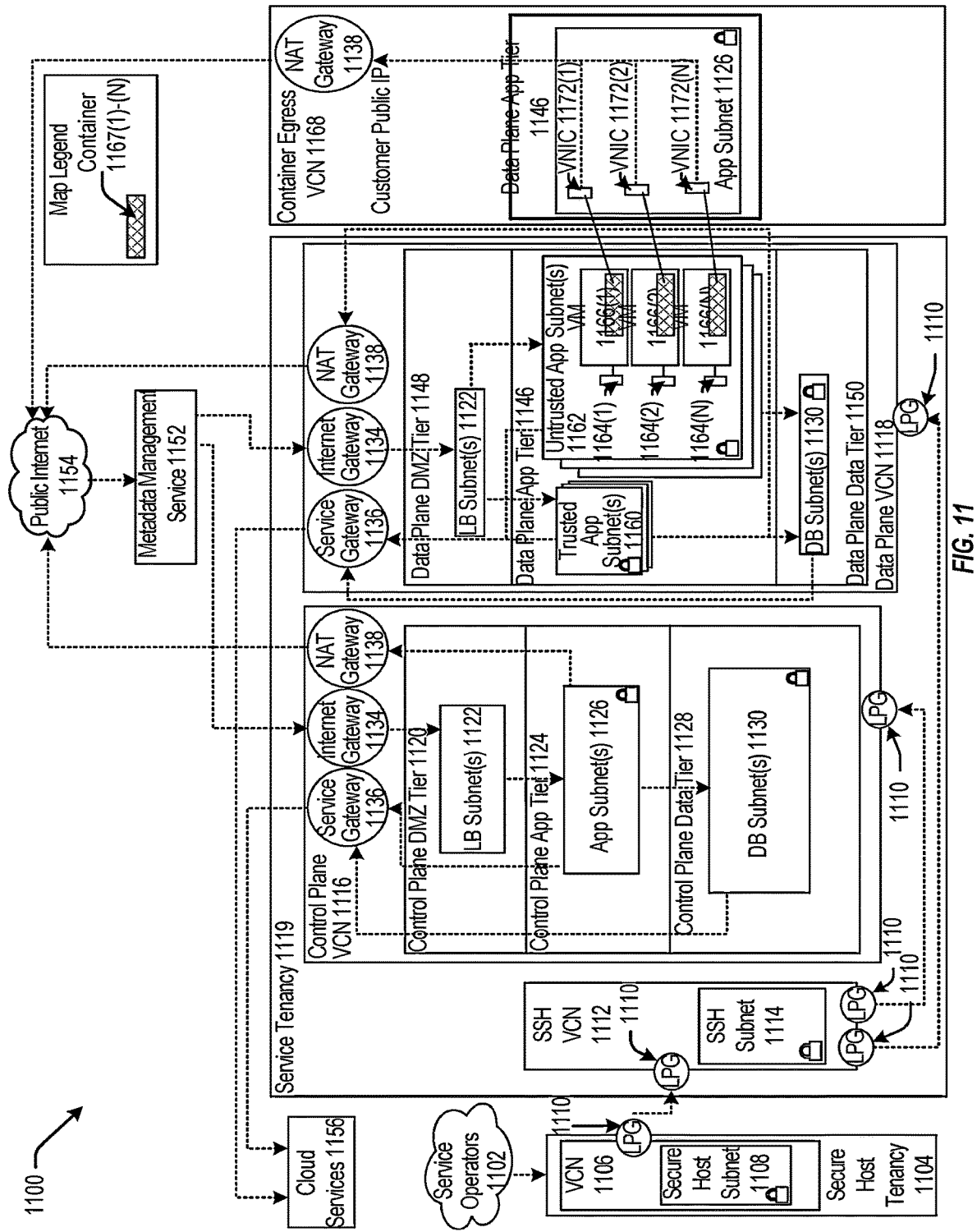
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), and a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
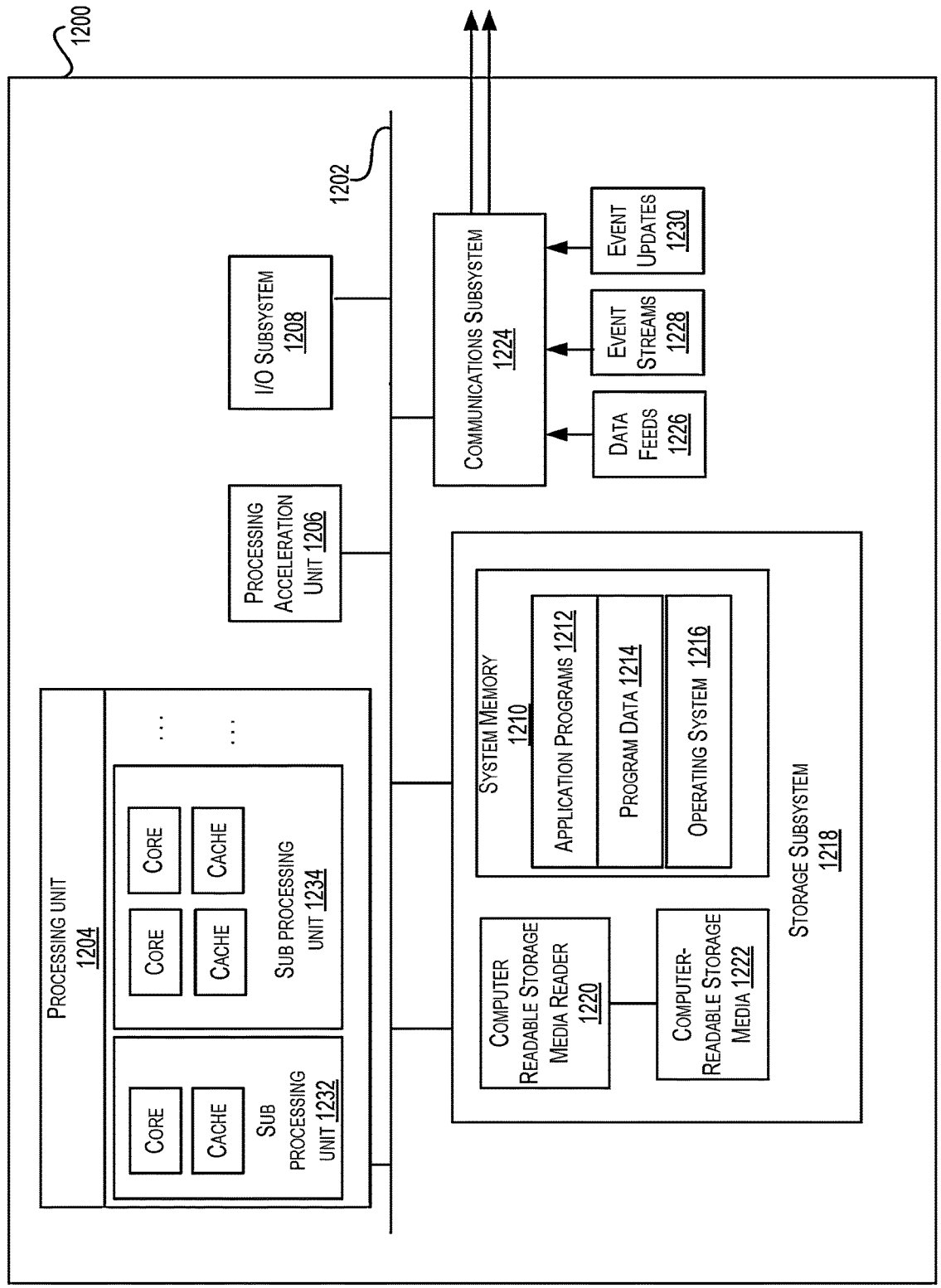
FIG. 12 is a block diagram illustrating an example computer system, according to at least one embodiment.

FIG. 12 illustrates an example computer system 1200 that may be used to implement various embodiments. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor units(s) 1204 and/or in storage subsystem 1218. Through suitable programming, processor units 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the claims is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the disclosed embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the claimed embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain embodiments and does not pose a limitation on the scope of the disclosed techniques. No language in the specification should be construed as indicating any non-claimed element as essential to the practice of the claimed embodiments.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments are described herein, including the best mode known for carrying out the various embodiments. Variations of those preferred embodiments may become apparent to those of ordinary skill in the art upon reading the foregoing description. Those of ordinary skill should be able to employ such variations as appropriate and the described embodiments may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, novel aspects are described with reference to specific embodiments thereof, but those skilled in the art will recognize that the disclosure is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
responsive to a model artifact being received by a computing system, extracting, by the computing system, a first component included in the model artifact;
determining, by the computing system, first metadata for the model artifact and second metadata for the first component extracted from the model artifact, the second metadata being different than the first metadata;
determining, by the computing system, a first validation check to be executed for the model artifact based on the first metadata determined for the model artifact;
determining, by the computing system, a second validation check to be executed for the first component extracted from the model artifact based on the second metadata for the first component, the second validation check being different than the first validation check;
executing, by the computing system, the first validation check to generate a first validation result, and the second validation check to generate a second validation result; and
validating the model artifact based at least on the first validation result and the second validation result.

2. The computer-implemented method of claim 1, wherein:
determining the first metadata for the model artifact comprises identifying a language associated with the model artifact; and
the first validation check is based upon the language associated with the model artifact.

3. The computer-implemented method of claim 1, wherein:
determining the second metadata for the first component comprises identifying a language associated with the first component; and
the second validation check is based upon the language associated with the first component.

4. The computer-implemented method of claim 1, wherein executing the first validation check comprises:
calling, by the computing system, an application programming interface for invoking one or more serverless functions for executing the first validation check; and
receiving, by the computing system, the first validation result generated from executing the first validation check.

5. The computer-implemented method of claim 1, wherein executing the first validation check comprises:
selecting, from a pool of available compute instances, a first compute instance for executing the first validation check;
subsequent to receiving the first validation result generated from executing the first validation check, releasing the first compute instance to the pool of available compute instances.

6. The computer-implemented method of claim 1, wherein executing the first validation check comprises:
determining, whether one or more additional components of the model artifact are to be extracted from the model artifact; and
checking whether the one or more additional components extracted from the model artifact include a subset of components needed for deployment of the model artifact.

7. The computer-implemented method of claim 1, further comprising:
determining whether the first validation result indicates a fail result for the first validation check;
responsive to determining that the first validation result indicates the fail result for the first validation check, determining a reason for the fail result for the first validation check; and
determining a suggested corrective action for the first validation check.

8. The computer-implemented method of claim 1, wherein executing the second validation check comprises:
generating one or more sets of synthetic data based on the second metadata associated with the first component; and
inputting the one or more sets of synthetic data into the first component of the model artifact to cause generation of an output prediction data, wherein the second validation result is based at least in part on the output prediction data.

9. The computer-implemented method of claim 1, further comprising:
generating, by the computing system, a validation report comprising information including the first validation check, the first validation result, the second validation check, and the second validation result.

10. The computer-implemented method of claim 1, further comprising:
extracting, by the computing system, information corresponding to a destination from the first metadata of the model artifact; and
deploying, by the computing system, the model artifact at the destination in response to the first validation check and the second validation check being successful.

11. A system comprising:
one or more processors; and
a memory including instructions that, when executed by the one or more processors, cause the system to perform processing comprising:
responsive to a model artifact being received by a computing system, extracting a first component included in the model artifact;
determining first metadata for the model artifact and second metadata for the first component extracted from the model artifact, the second metadata being different than the first metadata;
determining a first validation check to be executed for the model artifact based on the first metadata determined for the model artifact;
determining a second validation check to be executed for the first component extracted from the model artifact based on the second metadata for the first component, the second validation check being different than the first validation check;
executing the first validation check to generate a first validation result, and the second validation check to generate a second validation result; and
validating the model artifact based at least on the first validation result and the second validation result.

12. The system of claim 11, wherein the system is further configured to perform processing comprising:
determining the first metadata for the model artifact comprises identifying a language associated with the model artifact; and
the first validation check is based upon the language associated with the model artifact.

13. The system of claim 11, wherein the system is further configured to perform processing comprising:
determining the second metadata for the first component comprises identifying a language associated with the first component; and the second validation check is based upon the language associated with the first component.

14. The system of claim 11, wherein executing the first validation check comprises:
    calling an application programming interface for invoking one or more serverless functions for executing the first validation check; and
    receiving the first validation result generated from executing the first validation check.

15. The system of claim 11, wherein executing the first validation check comprises:
    selecting, from a pool of available compute instances, a first compute instance for executing the first validation check;
    subsequent to receiving the first validation result generated from executing the first validation check, releasing the first compute instance to the pool of available compute instances.

16. The system of claim 11, wherein executing the first validation check comprises:
    determining, whether one or more additional components of the model artifact are to be extracted from the model artifact; and
    checking whether the one or more additional components extracted from the model artifact include a subset of components needed for deployment of the model artifact.

17. The system of claim 11, wherein the system is further configured to perform processing comprising:
    determining whether the first validation result indicates a fail result for the first validation check;
    responsive to determining that the first validation result indicates the fail result for the first validation check, determining a reason for the fail result for the first validation check; and
    determining a suggested corrective action for the first validation check.

18. The system of claim 11, wherein executing the second validation check comprises:
    generating one or more sets of synthetic data based on the second metadata associated with the first component; and
    inputting the one or more sets of synthetic data into the first component of the model artifact to cause generation of an output prediction data, wherein the second validation result is based at least in part on the output prediction data.

19. The system of claim 11, wherein the system is further configured to perform processing comprising:
    extracting information corresponding to a destination from the first metadata of the model artifact; and
    deploying the model artifact at the destination in response to the first validation check and the second validation check being successful.

20. A non-transitory computer-readable medium storing a plurality of instructions executable by one or more processors, and when executed by the one or more processors causing the one or more processors to perform processing comprising:
    responsive to a model artifact being received by a computing system, extracting, by the computing system, a first component included in the model artifact;
    determining, by the computing system, first metadata for the model artifact and second metadata for the first component extracted from the model artifact, the second metadata being different than the first metadata;
    determining, by the computing system, a first validation check to be executed for the model artifact based on the first metadata determined for the model artifact;
    determining, by the computing system, a second validation check to be executed for the first component extracted from the model artifact based on second metadata for the first component, the second validation check being different than the first validation check;
    executing, by the computing system, the first validation check to generate a first validation result, and the second validation check to generate a second validation result; and
    validating the model artifact based on the first validation result and the second validation result.

\* \* \* \* \*